US012659596B2

(12) United States Patent　　　　(10) Patent No.:　US 12,659,596 B2
Chen et al.　　　　　　　　　　　　　(45) Date of Patent:　　Jun. 16, 2026

(54) METHODS AND SYSTEMS FOR REDUCING SCREEN REFLECTIONS ON EYEGLASSES IN LIVE STREAMING

(71) Applicant: Adeia Guides Inc., San Jose, CA (US)

(72) Inventors: Tao Chen, Palo Alto, CA (US); Ning Xu, Irvine, CA (US)

(73) Assignee: Adeia Guides Inc., San Jose, CA (US)

( * ) Notice:　Subject to any disclaimer, the term of this patent is extended or adjusted under 35 U.S.C. 154(b) by 191 days.

(21) Appl. No.: 18/526,357

(22) Filed:　Dec. 1, 2023

(65)　　　　Prior Publication Data

US 2025/0184615 A1　　Jun. 5, 2025

(51) Int. Cl.
　　　*H04N 23/74*　　　(2023.01)
　　　*H04L 65/1089*　　(2022.01)
　　　*H04N 5/268*　　　(2006.01)
　　　*H04N 23/611*　　(2023.01)
　　　*H04N 23/75*　　　(2023.01)
(52) U.S. Cl.
　　　CPC ......... *H04N 23/74* (2023.01); *H04L 65/1089* (2013.01); *H04N 5/268* (2013.01); *H04N 23/611* (2023.01); *H04N 23/75* (2023.01)
(58) Field of Classification Search
　　　CPC ...... H04N 23/74; H04N 5/268; H04N 23/611; H04N 23/75; H04N 23/72; H04N 23/76; H04L 65/1089; G06T 5/94; G06T 5/50; G06T 2207/10016; G06T 2207/20081; G06T 2207/20084; G06T 5/60; G06T 5/77; G06N 3/045; G06N 3/084
　　　USPC ......... 348/14.12, 14.03, 14.02, 14.08, 14.09, 348/14.1, 14.77, 14.78
　　　See application file for complete search history.

(56)　　　　References Cited

U.S. PATENT DOCUMENTS

2021/0390983 A1 * 12/2021 Yau ..................... H04N 5/2621

OTHER PUBLICATIONS

"[LCD Monitor] What are ELMB and ELMB Sync?" https://www.asus.com/us/support/faq/1045888/#:~:text=ASUS%20Extreme%20Low%20Motion%20Blur%20Sync%20(ELMB%20SYNC)%20is%20ASUS%27s,FreeSync%20at%20the%20same%20time. (2022). Retrieved from Internet Feb. 12, 2024.
"Brewster's angle" https://en.wikipedia.org/wiki/Brewster%27s_angle Retrieved from Internet Feb. 12, 2024.
"Event Camera" https://en.wikipedia.org/wiki/Event_camera Retrieved from Internet Feb. 12, 2024.

(Continued)

*Primary Examiner* — Duc Nguyen
*Assistant Examiner* — Carissa A Jones
(74) *Attorney, Agent, or Firm* — HG LAW LLP

(57)　　　　ABSTRACT

The present disclosure relates to methods and systems for e.g., eliminating, in a live capturing by a camera during a video conference, a reflection of an image rendered by a computer screen, on eyeglasses worn by a user facing said computer screen. This reflection tends to divert the other attendees' attention, which may extend the duration of the video conference. The computer screen alternates between a regular display state and a black-frame display state while the camera advantageously captures a series of images depicting the user's face only when the computer screen is in the black-frame display state, during which the computer screen does not emit any light. Each image of the captured series of images accordingly depicts the user's face wearing eyeglasses through which the user's eyes clearly appear unobstructed by the aforementioned reflection.

20 Claims, 18 Drawing Sheets

(56) References Cited

OTHER PUBLICATIONS https://www.nvidia.com/en-us/geforce/news/gfecnt/more-g-sync-compatible-gaming-monitors-validated/ Retrieved from Internet Feb. 12, 2024.

https://www.nvidia.com/en-us/geforce/products/g-sync-monitors/ Retrieved from Internet Feb. 12, 2024.

Huang, "Introducing AMD Freesync™ Premium and AMD FreeSync™ Premium Pro," https://www.nvidia.com/en-us/geforce/products/g-sync-monitors/ (2020) Retrieved from Internet Feb. 12, 2024.

Jordan, "Synchronize multiple cameras to capture at the same time," https://medium.com/inatech/synchronize-multiple-cameras-to-capture-at-the-same-time-c285b520bd87 (2020) Retrieved from Internet Feb. 12, 2024.

Wilson, "Exploring Input Lag Inside and Out," https://www.anandtech.com/show/2803 (2009) Retrieved from Internet Feb. 12, 2024.

* cited by examiner

③   105 — Appending camera-captured images based on the time of capture by the camera to form a video signal and storing the video signal for rendering on the user's display and for transmitting to a server (so as to be presented on the other attendees' displays)

④   107 — Presenting the video signal on the user's display and the other attendees' displays

Fig. 3 (Cont. I)
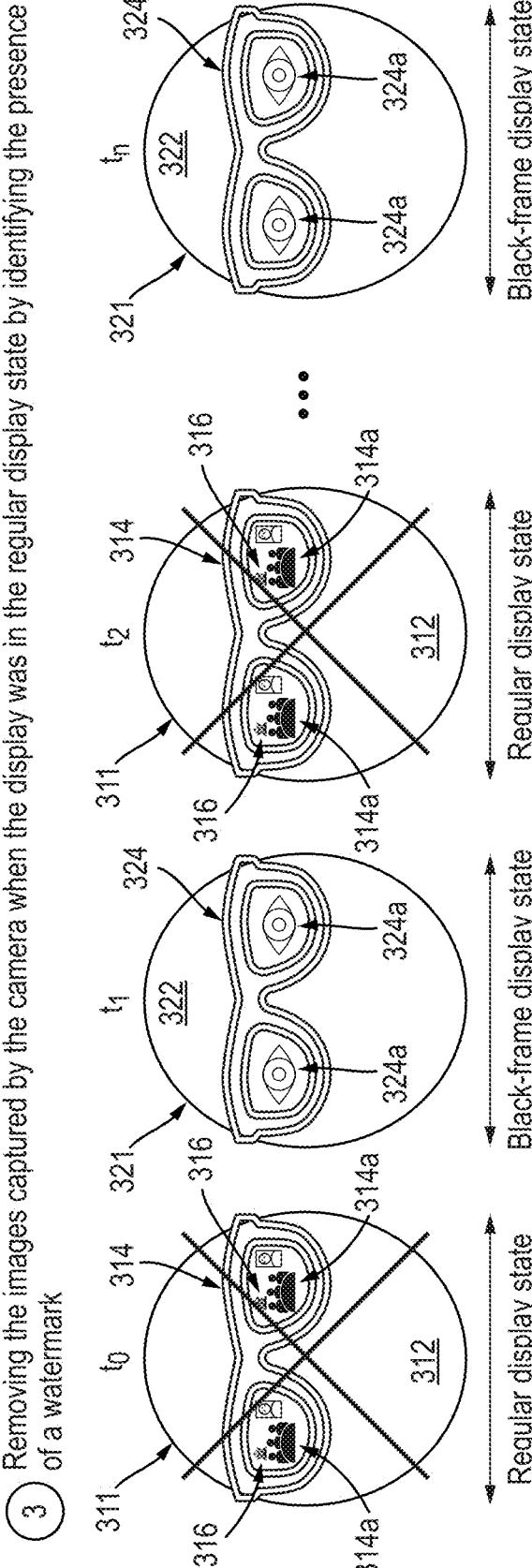

Fig. 3 (Cont. II)
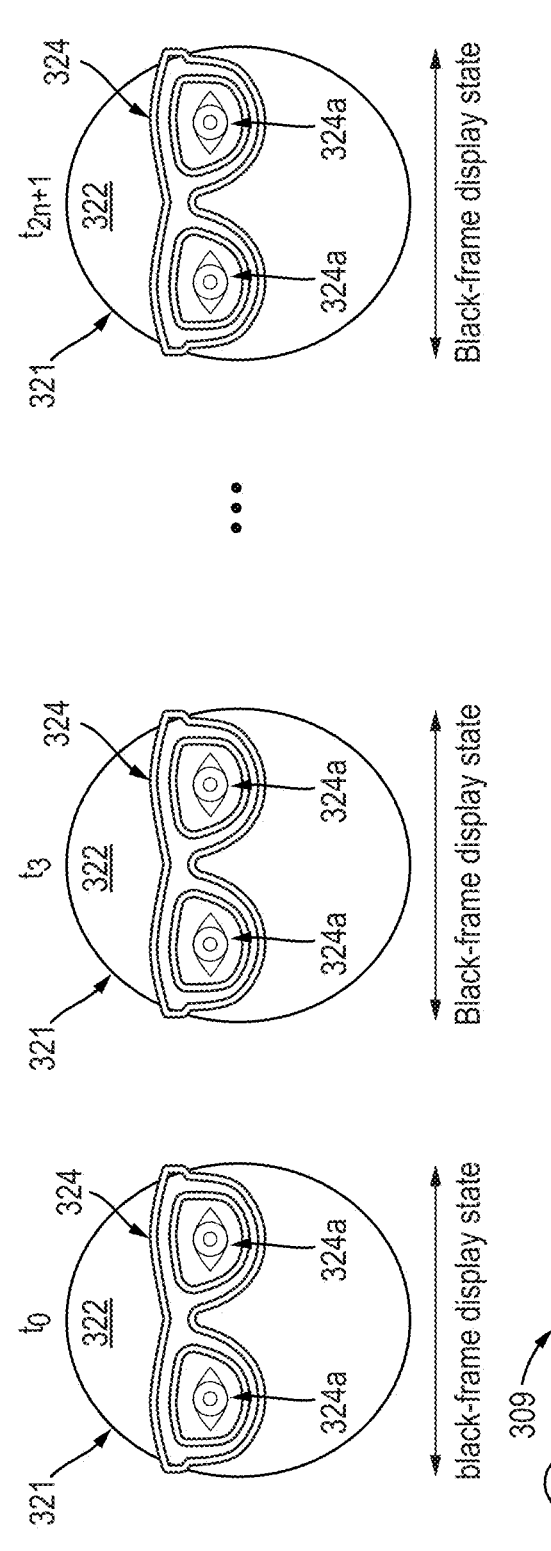

The illumination device is turned on when the display is in the black-frame display state The illumination device is turned off when the display is in the regular display state 508c

510

512

508

506

A rotating shutter hole aligns with the camera aperture when the display is in the black-frame display state

500

508b

508a

510

512

508

506

The disc of the rotating shutter covers the camera aperture when the display is in the regular display state

Fig. 6

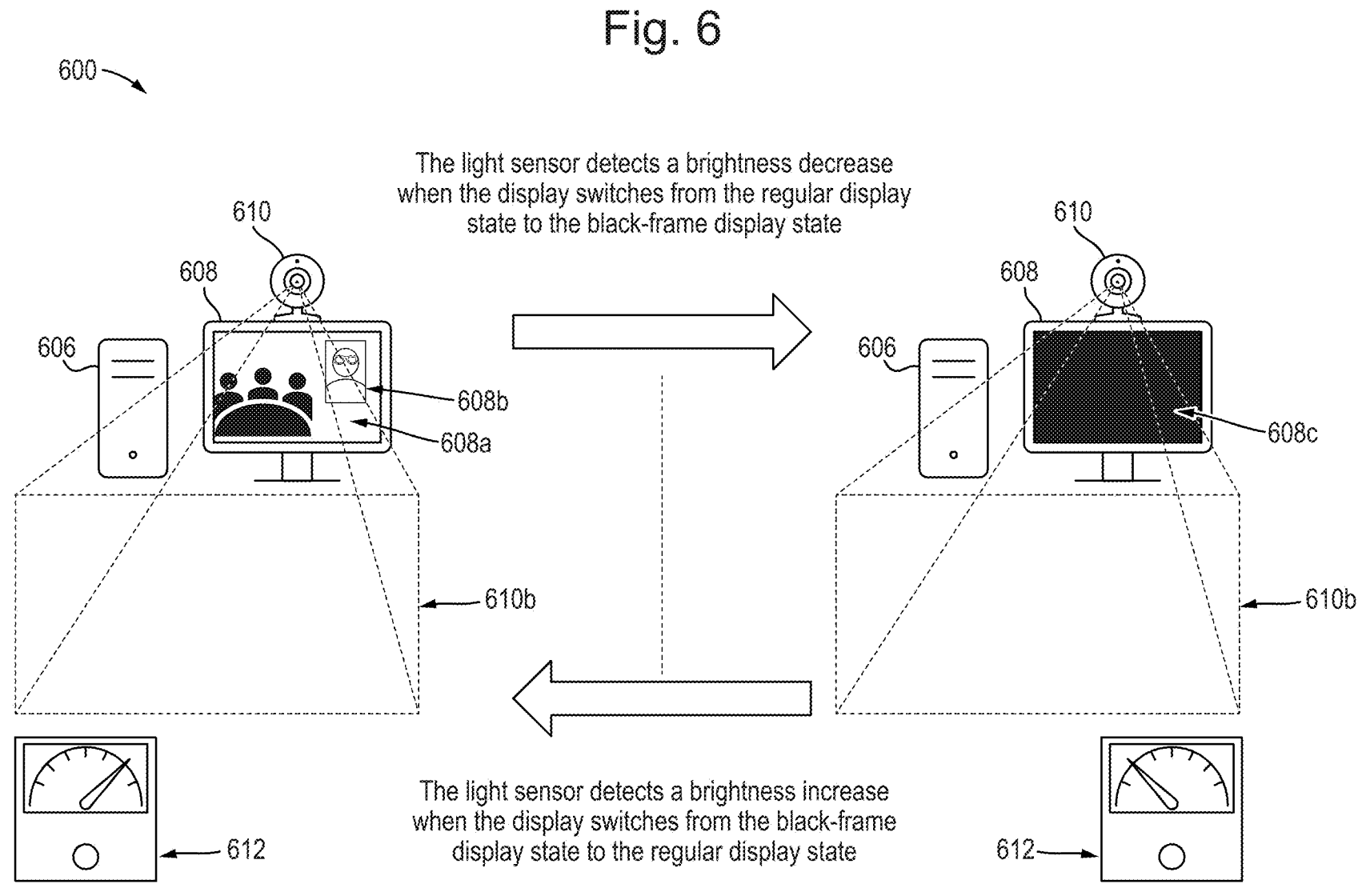

The light sensor detects a brightness decrease when the display switches from the regular display state to the black-frame display state The light sensor detects a brightness increase when the display switches from the black-frame display state to the regular display state Synchronizing the capturing the series of images with the display the user gazes at, and capturing the series of images using the camera Synchronizing the capturing the series of images with the display the user gazes at and capturing the series of images using the camera located the closest to the display gazed at by the user.

910 — Capture, by at least one camera, a series of images, wherein each image of the series of images includes a depiction of a reflective surface 912 — Receive an indication of timing of the at least one display switching from the black-frame display state to the regular display state, wherein the alternating from (a) the black-frame display state to (b) the regular display state is based on the indication of timing of the at least one display switching from the black-frame display state to the regular display state Yes → (A)

No

914 — Detect a brightness increase in a field of view of the at least one camera, that occur to the at least one display switching from the black-frame display state to the regular display state, wherein the alternating from (a) the black-frame display state to (b) the regular display state is based on the detected brightness increase (B)

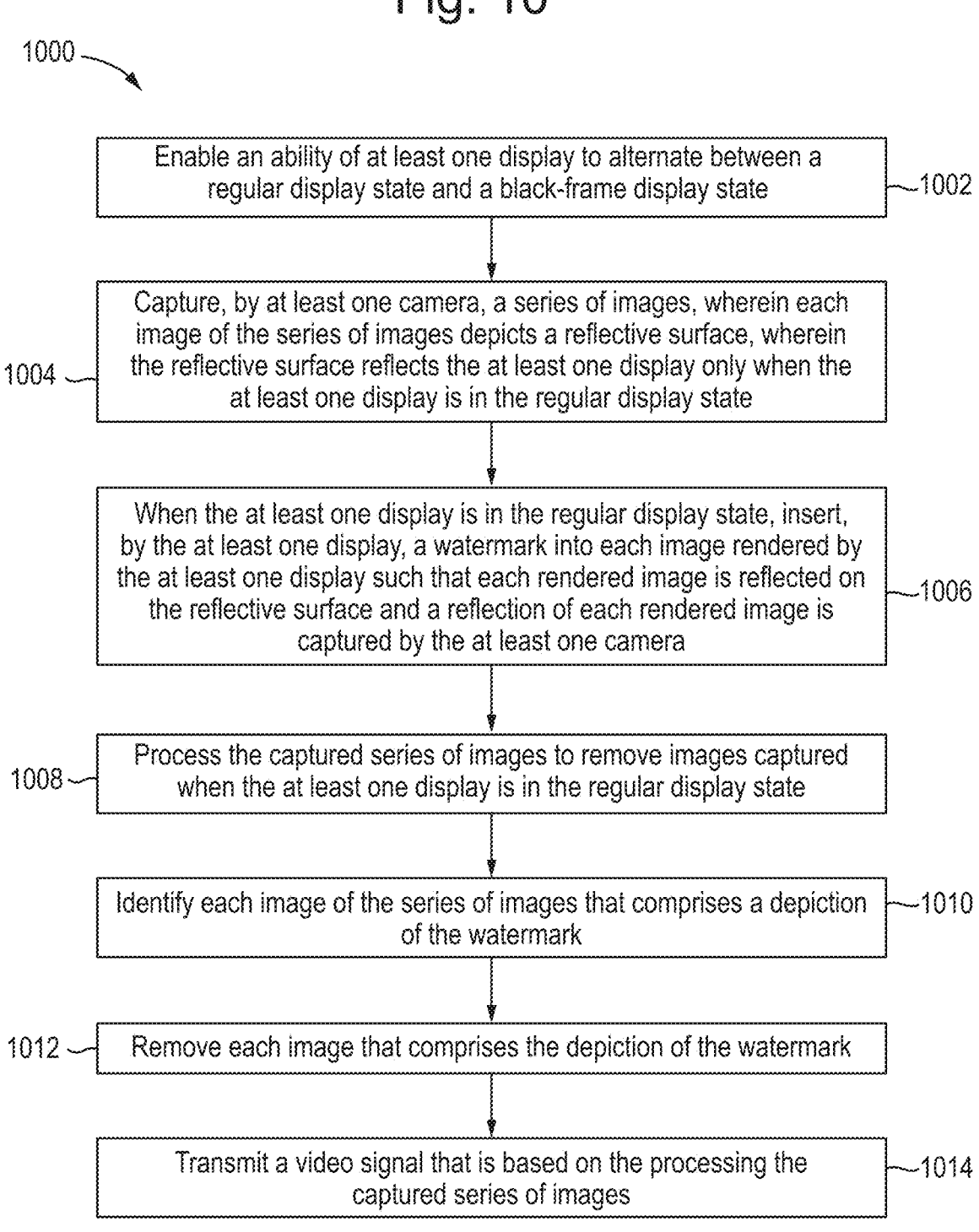

1000

Enable an ability of at least one display to alternate between a regular display state and a black-frame display state — 1002

Capture, by at least one camera, a series of images, wherein each image of the series of images depicts a reflective surface, wherein the reflective surface reflects the at least one display only when the at least one display is in the regular display state — 1004

When the at least one display is in the regular display state, insert, by the at least one display, a watermark into each image rendered by the at least one display such that each rendered image is reflected on the reflective surface and a reflection of each rendered image is captured by the at least one camera — 1006

Process the captured series of images to remove images captured when the at least one display is in the regular display state — 1008

Identify each image of the series of images that comprises a depiction of the watermark — 1010

Remove each image that comprises the depiction of the watermark — 1012

Transmit a video signal that is based on the processing the captured series of images — 1014

Each display alternates between a same regular display state and a same black-frame display state at the same time, i.e., first and second displays are in phase.

METHODS AND SYSTEMS FOR REDUCING SCREEN REFLECTIONS ON EYEGLASSES IN LIVE STREAMING

BACKGROUND

The present disclosure relates to methods and systems for eliminating, from a video signal produced from at least one camera, a reflection of an image rendered by at least one display, on a reflective surface located in a field of view of the at least one camera, during or after the capture, by the at least one camera, of a series of images. The present disclosure relates more particularly to methods and systems for eliminating, from a live stream produced for a video conference from a camera, a reflection of an image rendered by a computer screen, on eyewear (e.g., eyeglasses) worn by a user facing said computer screen during or after the capture, by the camera, of a series of images.

SUMMARY OF INVENTION

Eyewear (e.g., eyeglasses) worn by a user facing a computer screen tends to reflect the image rendered by the computer screen. When a user wearing an eyewear faces a computer screen and a camera (e.g., webcam) during a video conference, the user's camera captures a given number of images per second while the user's computer screen (e.g., a flat panel such as Liquid Crystal Displays or OLED-based panels) keeps alternating between a lit frame and a black frame as prescribed by the Black Frame Insertion (BFI) option (when selected). The BFI option (widely available on flat screens) produces superior motion clarity, especially for video games and sports. The lit frame corresponds to the image rendered by the user's computer screen whereas the black frame corresponds to the case where no light is emitted from the computer screen and is inserted to mitigate unpleasant motion blur affecting flat panels. When the user's computer screen displays a lit frame, the images captured by the user's camera depict the reflection of the image rendered by the user's computer screen on the user's eyewear, which conceals the user's eyes. When the user's computer screen displays a black frame, the images captured by the user's camera clearly depict the user's eyes as light is neither emitted from the user's computer screen nor reflected on the user's eyewear. During a video conference, the images captured by the user's camera are used to create a live video stream that is rendered by the computer screens of all video conference attendees e.g., the user, the attendees other than the user (i.e., the other attendees). Each image rendered by the user's computer screen and the other attendees' computer screens may consequently comprise an image captured by the user's camera. The sequence of images captured by the user's camera (when the user's computer screen alternates between the lit frame and the black frame) thus forms a video signal perceived by all attendees as if the user's eyewear were reflecting the user's computer screen at all times.

The image rendered by the user's computer screen (possibly comprising confidential information) accordingly becomes accessible to the other attendees and may disrupt their attention initially focused on the video conference. The other attendees may, for instance, attempt to decipher the image rendered by the computer screen during the video conference, which disrupts the other attendee's attention. Additionally, during the user's speech, no eye contact, so vital during a discussion, can be established, via computer screens, between the user and the other attendees. The user may thus lose the other attendees' attention when talking during the video conference. The aforementioned disruptions of the other attendees' attention may lead to extend the duration of the video conference in order for the other attendees to catch up anything they missed during these disruptions. This results in additional consumption of computing resources to produce video signals related to the recording of each attendee on camera, network resources to stream these video signals from the attendees' computers, through a server, to the attendees' computers, and energy to run these computing resources and network resources.

To reduce computer screen reflection on a user's eyewear in live streaming, a polarizing filter may be installed in front of the camera aperture and manually rotated to an angle to absorb the eyewear-reflected light rays in which the computer screen-rendered image is embedded. A computer screen-emitted light ray with a given polarization state strikes the eyewear at a given angle so as to be reflected towards the camera aperture as an eyewear-reflected light ray with a given polarization state. The polarization state of each eyewear-reflected light ray reaching the camera aperture mainly depends on the polarization state of the parent computer screen-emitted light ray and the angle at which the parent computer screen-emitted light ray strikes the eyewear. Moreover, an eyewear is mobile as much as the user wearing it is. Because of the aforementioned reasons, the set of eyewear-reflected light rays reaching the camera aperture exhibits a range of polarization states larger than the range of polarization states that the polarization filter can absorb, resulting in the capture, by the camera, of the reflection of the computer screen-rendered image on the user's eyewear. There is thus a need for methods and systems to efficiently and systematically eliminate the eyewear-reflected light produced by the user's computer screen.

Methods and systems are provided herein for eliminating, from a video signal produced from at least one camera, a reflection of an image rendered by at least one display, on a reflective surface located in a field of view of the at least one camera, during the capture of a series of images by the at least one camera. In some approaches, the at least one camera only captures images and the at least one display only renders images. In some approaches, the at least one camera at least captures images and the at least one display at least renders images. In some approaches, a user device (e.g., computer, laptop, tablet, mobile phones and the likes) is connected to at least one of the at least one display and the at least one camera, via a communication network (e.g., LAN and/or WAN) or a wired connection. In some approaches, the at least one display and the at least one camera are both controlled by the user device. In some approaches, the at least one camera and the at least one display are separate pieces of hardware, each having an own casing. In some approaches, the at least one camera is integrated in the frame of the at least one display. In some approaches, the aperture of the at least one camera is fixed in space. Alternatively, the aperture of the at least one camera is mobile in space: the aperture rotates around e.g., a yaw axis and/or a pitch axis.

In some embodiments, the at least one camera captures a series of images, wherein each image of the series of images includes a depiction of a reflective surface. The user device synchronizes the capturing the series of images with at least one display alternating between (a) a regular display state and (b) a black-frame display state, wherein the captured series of images are captured only when the at least one display is in the black-frame display state. In some approaches, the reflective surface reflects the at least one display only when the at least one display is in the regular display state. In some approaches, the user device outputs a video signal based on the captured series of images.

Hereby, it is possible to take advantage of e.g., the BFI option widely available on flat screens that periodically generates a black frame (in between two lit frames) for a given period, during which the at least one display does not any emit light that can be subsequently reflected on the reflective surface. Each image captured by the at least one camera during this period does not depict any reflection of the image rendered by the at least one display on the reflective surface: this reflection is systematically eliminated from the images captured by the at least one camera. The same, therefore, applies to the video signal based on the captured series of images: the video signal depicts the reflective surface exempt of the problematic reflection.

In some embodiments, the reflective surface comprises surface of eyewear (e.g., eyeglasses, goggles) worn by a user participating in a video conference via the at least one display. In some approaches, the user device transmits the video signal into a video conference.

In this way, any reflection of the image rendered by the at least one display on eyewear worn by a user participating in a video conference via the at least one display is eliminated from the video signal produced from the series of images captured by the at least one camera, resulting in the clear perception, by the other attendees, of the user's eyes that are therefore unobstructed by the problematic reflection. This avoids the disruption of the other attendees' attention and the additional consumption of computing resources, network resources and energy to run them.

In some embodiments, the user device controls the capturing the series of images by at least determining an alternating rate of the at least one display i.e., a number of times the at least one display alternates between the regular display state and the black-frame display state per a time unit. Additionally or alternatively, the user device controls the capturing the series of images by at least determining an image capture rate of the at least one camera i.e., a number of times the at least one camera captures an image per a time unit. Additionally or alternatively, the user device controls the capturing the series of images by at least comparing the alternating rate of the at least one display and the image capture rate of the at least one camera when the time unit used for the alternating rate and the image capture rate is the same one. Additionally or alternatively, the user device controls the capturing the series of images by at least setting the image capture rate of the at least one camera to be equal to or greater than the alternating rate of the at least one display.

Hereby, the at least one camera is able to capture one or more images per display state, which ensures that images can be captured by the at least one camera when the at least one display is in the black-frame display state.

In some embodiments, the user device controls the capturing the series of images by at least closing an aperture of the at least one camera when the at least one display is in the regular display state. Additionally or alternatively, the user device controls the capturing the series of images by at least opening the aperture of the at least one camera when the at least one display is in the black-frame display state.

In some instances, a rotating shutter obstructs the aperture when the at least one display is in the regular display state and leaves the aperture unobstructed when the at least one display is in the black-frame display state. For instance, the rotating shutter is a disc presenting holes on the rim of the disc such that the distance between two consecutive holes corresponds to the product of the disc rotation velocity and the period during which the at least one display is in the regular display state (as the aperture of the at least one camera should remain obstructed when the at least one display is in a regular display state). In some instances, the rotating shutter is in communication with the user device via a communication network or a wired connection. In some instances, non-transitory computer-readable instructions stored on a non-transitory computer readable medium and executed by control circuitry of the user device comprise instructions to control (e.g., disable, enable or set the rotation velocity of the rotating shutter) the rotating shutter based on the alternating of the at least one display between the regular display state and the black-frame display state as prescribed by the BFI option. In some instances, the rotating shutter is integrated within the at least one camera. In some instances, the rotation shutter is mounted in front of the aperture of the at least one camera.

Other shutter types can be used to obstruct the aperture of the at least one camera and leave the aperture of the at least one camera unobstructed. In some instances, a shutter comprises an object able to undergo a (mathematical) translation following an axis so as to obstruct and/or leave unobstructed the aperture of the at least one camera. In some instances, a shutter comprises a movable object following at least a portion of a linear motion and/or a circular motion so as to obstruct the aperture of the at least one camera. Additionally, the shutter comprises a movable object following at least a portion of a linear motion and/or a circular motion so as to leave unobstructed the aperture of the at least one camera.

This ensures that the at least one camera capture images only when the at least one display is in the black-frame display state in order to systematically capture images depicting no reflection of an image rendered by the at least one display on the reflective surface, and to systematically eliminate any reflection of an image rendered by the at least one display on the reflective surface during the capturing of the series of images. The opening/closing of the aperture of the at least one camera to systematically capture images depicting no reflection of an image rendered by the at least one display on the reflective surface is successful when the image capture rate of the at least one camera is equal to or greater than the alternating rate of the at least one display.

In some embodiments, the user device controls the capturing the series of images by at least disabling a video capture functionality of the at least one camera when the at least one display is in the regular display state. Additionally or alternatively, the user device controls the capturing the series of images by at least enabling the video capture functionality of the at least one camera when the at least one display is in the black-frame display state. In some instances, non-transitory computer-readable instructions stored on a non-transitory computer readable medium and executed by control circuitry of the user device comprise instructions to control (e.g., disable or enable) the video capture functionality of the at least one camera based on the alternating of the at least one display between the regular display state and the black-frame display state, prescribed by the BFI option.

As webcams usually do not integrate a rotating shutter (let alone a rotating shutter that could be programmed to obstruct or leave unobstructed a camera aperture based on the alternating of the at least one display between the regular display state and the black-frame display state, as prescribed by the BFI option), such embodiments represent an alternative way to ensure that the at least one camera capture images only when the at least one display is in the black-frame display state in order to systematically capture images depicting no reflection of an image rendered by the at least one display on the reflective surface, and to systematically eliminate any reflection of an image rendered by the at least one display on the reflective surface during the capturing of the series of images. The enabling/disabling of the video capture functionality (to systematically capture images depicting no reflection of an image rendered by the at least one display on the reflective surface) is successful when the image capture rate of the at least one camera is equal to or greater than the alternating rate of the at least one display.

In some embodiments, the user device turns off an illumination device when the at least one display is in the regular display state. Additionally or alternatively, the user device turns on the illumination device when the at least one display is in the black-frame display state. In some approaches, the illumination device is configured to illuminate at least a part of a field of view of the at least one camera. In some approaches, the illumination device is in communication with the user device via a communication network or a wired connection. In some instances, non-transitory computer-readable instructions stored on a non-transitory computer readable medium and executed by the control circuitry of the user device comprise instructions to control (e.g., enable, disable or tune the brightness, produced by the illumination device, in at least a portion of the field of view of the at least one camera) the illumination device based on the alternating of the at least one display between the regular display state and the black-frame display state, as prescribed by the BFI option.

The use of an illumination device (e.g., auxiliary lamp whose brightness can be tuned by varying the voltage) becomes necessary when the at least one display is the only available light source as the images are to be captured by the at least one camera when the at least one display is in the black-frame display state i.e., when no light is emitted from the at least one display. In effect, the illumination device offsets the lack of light induced by the establishment of the black-frame display state in order for the at least one camera to capture images clearly depicting the user and in particular the user's face and eyes. Without the illumination device, the user and the user's eyes might be unperceivable by the other attendees in the video signal based on the series of images captured by the at least one camera.

In some embodiments, the user device controls the capturing the series of images by at least receiving an indication of timing of the at least one display switching between the regular display state and the black-frame display state, wherein the alternating between (a) the regular display state and (b) the black-frame display state is based on the indication of timing of the at least one display switching between the regular display state and the black-frame display state.

Hence, when the user device is in communication with the at least one display via a communication network or a wired connection, the user device receives information, from the at least one display, relating to the alternating of the at least one display between the regular display state and the black-frame display state (as prescribed by the BFI option). The information relates to e.g., start of the period during which the at least one display is in the black-frame display state, end of the period during which the at least one display is in the black-frame display state, duration of the black-frame display state period, start of the period during which the at least one display is in the regular display state, end of the period during which the at least one display is in the regular display state, duration of the regular display state period or any combination thereof. The user device then orders the at least one camera to capture images when the at least one display state starts to be in the black-frame display state and stop capturing images when the at least one display switches to the regular display state. The capturing of the images by the at least one camera when the at least one display is in the black-frame display state is therefore performed more accurately than if the user device were not in communication with the at least one display and had to determine (using means other than the communication between the user device and the at least one display) when to capture and stop capturing images.

In some embodiments, a light sensor detects brightness changes in a field of view of the at least one camera, that occur to the at least one display switching between the regular display state and the black-frame display state wherein the alternating between (a) the regular display state and (b) the black-frame display state is based on the detected brightness changes. In some instances, the light sensor is in communication with the user device via a communication network or a wired connection. In some instances, non-transitory computer-readable instructions stored on a non-transitory computer readable medium and executed by the control circuitry of the user device comprise instructions to control (e.g., enable, disable, calibrate the light sensor using an illumination device able to produce a variety of known brightness levels, access brightness readings from the light sensor) the light sensor.

Accordingly, the user device monitors in real time, using the light sensor, the brightness changes in the field of view of the at least one camera, that occur to the at least one display when the at least one display alternates between the regular display state and the black-frame display state (as prescribed by the BFI option). This allows the user device, when e.g., not or not anymore in communication with the at least one display, for determining the display state in which the at least one display is, and determining whether to request, from the at least one camera, to trigger on or stop the capturing the series of images.

In some embodiments, the user device measures the brightness level of the images (or at least a portion of each image e.g., the user's face) captured by the at least one camera to determine the display state in which the at least one display is. In some instances, non-transitory computer-readable instructions stored on a non-transitory computer readable medium and executed by the control circuitry of the user device comprise instructions to control a machine learning model to assess the brightness level of images captured by the at least one camera, determine the display state in which the at least one display is and determine whether to request, from the at least one camera, to trigger on or stop the capturing the series of images. In some instances, the user device removes the captured images that were captured when the at least one display state was in the regular display state (as determined by the measurements of the brightness level of at least a portion of each image captured by the at least one camera).

Monitoring the brightness level of the images captured by the at least one camera (right after their capture) is an alternative route to determine the display state in which the at least one display is, and to request, from the at least one camera, to trigger on or stop the capturing the series of images.

In some embodiments, the at least one camera comprises a first camera, the at least one display comprises a first display and a second display and the reflective surface comprises surface of glasses worn by a user participating in a video conference via the first display and the second display such that the captured series of images depicts at least one eye of the user behind the surface of glasses. In some approaches, in response to determining that a retina of the at least one eye of the user is directed to the first display, the user device synchronizes the capturing with the first display alternating between (a) the regular display state and (b) the black-frame display state. Additionally or alternatively, in response to determining that the retina of the at least one eye of the user is directed to the second display, the user device synchronizes the capturing with the second display alternating between (a) the regular display state and (b) the black-frame display state.

In some instances, an eye-tracking device determines whether the user gazes at the first display or the second display in order to select the display with which the user device synchronizes the capturing the series of images. Alternatively, the eye-tracking device determines whether the user's gaze is directed closer to the first display or the second display in order for the user device to synchronize the capturing the series of images with the first display or the second display, respectively. In some instances, the eye-tracking device comprises an infrared light emitter and an infrared light sensor. The infrared light emitter emits an infrared light (e.g., continuously or through pulses) towards a retina of the at least one eye that reflects the infrared light in a given direction, which is then captured by the infrared light sensor. The given direction of the reflected infrared light indicates where the user gazes at. In some instances, the eye-tracking device is in communication with the user device via a communication network or a wired connection. In some instances, non-transitory computer-readable instructions stored on a non-transitory computer readable medium and executed by the control circuitry of the user device comprise instructions to control (e.g., enable, disable, forward results from the eye-tracking device to the user device) the eye-tracking device. In some instances, the eye-tracking device is a standalone device located in front of the user. In some instances, the eye-tracking device is mounted on the user's eyeglasses. In some instances, the eye-tracking device is integrated within the user's eyeglasses. In some instances, the eye-tracking device is mounted on the first camera. In some instances, the eye-tracking device is integrated within the first camera.

When a user has two displays and one camera at disposal during a video conference, the user usually directs their gaze towards one of the displays. To do so, the user usually rotates their head to gaze at the display of interest, rather than moving their eyes. The eye-tracking device determines which display the user gazes at and the user device synchronizes the capturing the series of images with the display gazed at i.e., the user-selected display. The head rotation changes the orientation of the eyeglasses worn by the user such that the eyeglasses are to preferentially reflect the image rendered by the user-selected display rather than the image rendered by the display that the user does not gaze at. The reflection of the image rendered by the display the user does not gaze at, on the user's eyewear, is negligible if not absent. Such approaches are thus to systematically capture images depicting no reflection of an image rendered by the at least one display on the user's eyeglasses, and to systematically eliminate any reflection of an image rendered by the at least one display on the user's eyeglasses during the capturing of the series of images.

In some embodiments, the at least one camera comprises a first camera and the at least one display comprises a first display and a second display. In some approaches, the user device synchronizes the capturing the series of images with both (i) the first display alternating between (a) the regular display state of the first display and (b) the black-frame display state of the first display, and (ii) the second display alternating between (c) the regular display state of the second display and (d) the black-frame display state of the second display. In some approaches, the captured series of images are captured only when each of the first display and the second display is in a respective black-frame display state.

When a user has two displays and one camera at disposal during a video conference, the user device synchronizes the capturing the series of images with both displays (irrespective of the direction the user's gaze) such that the capturing the series of images occurs when both displays are in a respective black-frame display. This configuration presents the advantage of not requiring any eye-tracking device.

In some embodiments, the at least one camera comprises a first camera and the at least one display comprises a first display and a second display. In some approaches, the user device configures the first display and the second display to synchronize (i) the first display alternating between (a) the regular display state of the first display, and (b) the black-frame display state of the first display, and (ii) the second display alternating between (c) the regular display state of the second display, and (d) the black-frame display state of the second display.

Since the user usually gazes at the first display or second display during the video conference, it is possible to configure both displays to simultaneously alternate between the same regular display state and the same black-frame display state, wherein both display states are derived from one of the two available displays. The first display and second display are thus in phase. This configuration also presents the advantage of not requiring any eye-tracking device.

In some embodiments, the at least one camera comprises a first camera and a second camera and the at least one display comprises a first display and a second display. In some approaches, the reflective surface comprises surface of glasses worn by a user participating in a video conference via the first display and the second display. In some approaches, the user device controls the capturing the series of images by requesting the first camera to capture a first series of images when a retina of the at least one eye of the user points towards the first display. Alternatively or additionally, the user device controls the capturing the series of images by requesting the second camera to capture a second series of images when the retina of the at least one eye the user points towards the second display.

In some instances, an eye-tracking device determines whether the user gazes at the first display or the second display in order to select the display with which the user device synchronizes the capturing the series of images. Alternatively, the eye-tracking device determines whether the user's gaze is directed closer to the first display or the second display in order for the user device to synchronize the capturing the series of images with the first display or the second display, respectively. In some instances, the eye-tracking device comprises an infrared light emitter and an infrared light sensor. The infrared light emitter emits an infrared light (e.g., continuously or through pulses) towards a retina of the at least one eye that reflects the infrared light in a given direction, which is then captured by the infrared light sensor. The given direction of the reflected infrared light indicates where the user gazes at. In some instances, the eye-tracking device is in communication with the user device via a communication network or a wired connection.

In some instances, non-transitory computer-readable instructions stored on a non-transitory computer readable medium and executed by the control circuitry of the user device comprise instructions to control (e.g., enable, disable, forward results from the eye-tracking device to the user device) the eye-tracking device. In some instances, the eye-tracking device is a standalone device located in front of the user. In some instances, the eye-tracking device is mounted on the user's eyeglasses. In some instances, the eye-tracking device is integrated within the user's eyeglasses. In some instances, an eye-tracking device is mounted on the first camera and/or the second camera. In some instances, an eye-tracking device is integrated within the first camera and/or the second camera.

When a user has two displays and two cameras at disposal during a video conference, the user usually directs their gaze towards one of the two displays. To do so, the user usually rotates their head to gaze at the display of interest, rather than moving their eyes. The eye-tracking device determines which display the user gazes at and the user device synchronizes the capturing the series of images with the display gazed at i.e., the user-selected display. The head rotation changes the orientation of the eyeglasses worn by the user such that the eyeglasses are to preferentially reflect the image rendered by the user-selected display rather than the image rendered by the display that the user does not gaze at. The reflection of the image rendered by the display the user does not gaze at, on the user's eyeglasses, is negligible if not absent. Such approaches are thus to systematically capture images depicting no reflection of an image rendered by the at least one display on the user's eyeglasses, and to systematically eliminate any reflection of an image rendered by the at least one display on the user's eyeglasses during the capturing of the series of images.

In some embodiments, an aperture of the first camera is located closer to the first display than to the second display and an aperture of the second camera is located closer to the second display than to the first display.

The camera to capture the series of images when the display has been selected by the user is the one that allows for capturing images depicting the user's face wherein the user's at least one eye is to occupy the largest area proportionally to the captured image size. In other words, the aperture of the selected camera (when considering that the aperture of the camera is fixed in space) is to be located the closest to the user-selected display. This configuration ensures that the user's face is always captured by the camera having the most detailed view of the user's at least one eye, which is of utmost importance for a video conference.

However, this configuration may lead to frequent changes of perspectives, which may disturb the other attendees and the user. A threshold, the lowest number of changes of perspectives per a time unit ($t_{unit}$) below which this disturbance is not caused, and from and above which this disturbance is caused, is determined for each attendee of the video conference by analyzing the facial expressions of the user and the other attendees. Then, a minimum threshold value is extracted from the threshold values determined for each attendee. Accordingly, when the minimum threshold value is reached after a time $t_{mtv}$, the camera to capture the series of images remains the camera to capture the series of images at time $t_{mtv}$ until the time gap corresponding to ($t_{unit}$–$t_{mtv}$) has passed. After the time gap has passed, the camera to capture the series of images when the display has been selected by the user is again the one that allows for capturing images depicting the user's face wherein the user's at least one eye is to occupy the largest area proportionally to the captured image size.

In some approaches, non-transitory computer-readable instructions stored on a non-transitory computer readable medium and executed by control circuitry of the user device comprise instructions to control a machine learning model able to analyze the facial expressions of the user and the other attendees to determine whether the user and the other attendees are subjected to a disturbance caused by frequent changes of perspectives, to determine the threshold value for each video conference attendee and the minimum threshold value, and to select which camera is to capture the series of images at any given time.

In some embodiments, the user device outputs the video signal by at least storing the video signal. Additionally or alternatively, the user device outputs the video signal by at least generating for display the video signal on the at least one display.

In this way, the user device stores and presents the video signal, allowing the user to view themselves during the video conference.

In some embodiments, the user device outputs the video signal that is based on the captured series of images by at least transmitting the video signal to a server.

The user device is able to transmit the user's video signal to a server that stores it at an address e.g., URL. The other attendees of the video conference are then able to request, from the server, the user's video signal (using the address), receive and present it on their respective user device.

Methods and systems are provided herein for filtering out, from a video signal produced from at least one camera, a reflection of an image rendered by at least one display, on a reflective surface located in a field of view of the at least one camera after the capture of a series of images by the at least one camera. In some approaches, the at least one camera only captures images and the at least one display only renders images. In some approaches, the at least one camera at least captures images and the at least one display at least renders images. In some approaches, a user device (e.g., computer, laptop, tablet, mobile phones and the likes) is connected to at least one of the at least one display and the at least one camera, via a communication network (e.g., LAN and/or WAN) or a wired connection. In some approaches, the at least one display and the at least one camera are both controlled by the user device. In some approaches, the at least one camera and the at least one display are separate pieces of hardware, each having an own casing. In some approaches, the at least one camera is integrated in the frame of the at least one display. In some approaches, the aperture of the at least one camera is fixed in space. Alternatively, the aperture of the at least one camera is mobile in space: the aperture rotates around e.g., a yaw axis and/or a pitch axis.

In some embodiments, the at least one camera captures a series of images, wherein each image of the series of images includes a depiction of a reflective surface. In some approaches, the at least one camera captures a series of images, wherein at least one display alternates between a regular display state and a black-frame display state. In some approaches, the reflective surface reflects the at least one display only when the at least one display is in the regular display state. In some approaches, the user device processes the captured series of images to remove images captured when the at least one display is in the regular display state. In some approaches, the user device transmits a video signal that is based on the processing the captured series of images.

It is an alternative way to take advantage of the BFI option widely available on flat screens. The at least one camera captures images irrespective of the display state (i.e., either the regular display state or the black-frame display state) in which the at least one display is. The user device then removes each image captured when the at least one display is in the regular display state, in other words, each image depicting the reflection of an image rendered by the at least one display on the reflective surface. In this configuration, there is no need to have the user device synchronize the capturing the series of images with the alternating of the at least one display between a regular display state and a black frame display state. However, the captured series of images has to be sorted into images captured by the at least one camera when the at least one display is in the regular display state and images captured by the at least one camera when the at least one display is in the black-frame display state, in order to remove the former, i.e., the images that depict the reflection of an image rendered by the at least one display on the reflective surface.

In some embodiments, when the at least one display is in the regular display state, the at least one display is configured to insert a watermark into each image rendered by the at least one display such that each rendered image is reflected on the reflective surface and a reflection of each rendered image is captured by the at least one camera. In some approaches, the user device processes the captured series of images by at least identifying each image of the series of images that comprises a depiction of the watermark. Additionally or alternatively, the user device processes the captured series of images by at least removing each image that comprises the depiction of the watermark.

In some examples, a machine learning model analyzes the captured images to identify the presence of a watermark (initially added on an image rendered by the at least one display and subsequently present on the reflection of the image rendered by the at least one display on the reflective surface when the at least one display is in regular display state). Additionally or alternatively, a machine learning model analyzes the captured images to identify the absence of a watermark. In some instances, non-transitory computer-readable instructions stored on a non-transitory computer readable medium and executed by control circuitry of the user device comprise instructions to control the machine learning model identifying the presence and/or the absence of a watermark.

When the at least one display is in the regular display state, the at least one display inserts a watermark on the images rendered by the at least one display such that both the reflection of the images rendered by the at least one display and the images (captured by the at least one camera) depicting the reflection of the images rendered by the at least one display exhibit a watermark. When the at least one display is in the black-frame display state, there is neither light emitted by the at least one display, nor an image rendered by the at least one display, nor watermark inserted on the image rendered by the at least one display, nor reflection of the image rendered by the at least one display on the reflective surface, nor watermark present in the reflection of the image rendered by the at least one display on the reflective surface. Hereby, it is possible to easily distinguish between captured images depicting or not a reflection of an image rendered by the at least one display on a reflective surface by simply identifying the presence or the absence of a watermark using a machine learning model.

In some embodiments, the reflective surface comprises surface of glasses worn by a user participating in a video conference via the at least one display. In some approaches, the user device processes the captured series of images by at least identifying each image of the series of images that comprises a depiction of at least one eye of the user obstructed by a reflection of the at least one display on the reflective surface. Additionally or alternatively, the user device processes the captured series of images by at least removing each image that comprises the depiction of the at least one eye obstructed by the reflection of the at least one display on the reflective surface.

In some examples, a machine learning model analyzes the captured images to identify the presence of a depiction of at least one eye of the user obstructed by a reflection of an image rendered by the at least one display on the user's eyeglasses. Additionally or alternatively, a machine learning model analyzes the captured images to identify the presence of a depiction of at least one eye of the user unobstructed by a reflection of the at least one display on the user's eyeglasses. Distinguishing an eye without glare is easier than distinguishing an eye with glare. In some instances, non-transitory computer-readable instructions stored on a non-transitory computer readable medium and executed by the control circuitry of the user device comprise instructions to control the machine learning model identifying the presence of a depiction of at least one eye obstructed or unobstructed by a reflection of an image rendered by the at least one display on the user's eyeglasses.

BRIEF DESCRIPTION OF THE DRAWINGS

FIG. 6 illustrates an example of a user device producing a video signal for a video conference, in accordance with some implementations of the disclosure;

DETAILED DESCRIPTION

As referred herein, the term 'user device' should be understood to mean a device configured to e.g., play a content item (e.g., video signal associated with or without audio data), prepare a content item by appending images captured by a camera, store a content item and encode a content item to send the content item to e.g., a server or another user device. In FIGS. 1 to 12, the user device may be e.g., a mobile phone, a tablet, a computer, a television and the likes, and is set up in the following manner:

the user device is in communication with at least one display (e.g., a computer screen) and at least one camera (e.g., webcam) via a communication network (e.g., LAN or WAN) or a wired connection;

the user device is in communication with a server (e.g., local or remote server) via a communication network (e.g., LAN or WAN); and the user device controls the at least one display and the at least one camera: non transitory computer-readable instructions stored on a non-transitory computer readable medium and executed by control circuitry of the user device comprise instructions to control the at least one display and the at least one camera.

The at least one display has the ability (when enabled by the user device) to alternate between a regular display state and a black-frame display state, the black-frame display state corresponding to the case where no light is emitted by the at least one display. In FIGS. 1 to 12, this ability is enabled by the user device.

In FIGS. 1 to 12, the at least one camera has a fixed aperture and captures a series of images whose main subject is e.g., the user's face.

In some embodiments related to FIGS. 2, 4 to 9 and 12, the camera (or the selected camera if there are several cameras) captures images only when the display (or the selected display if there are several displays) is in the black-frame display state (even if there is no pyramid drawn in dashed lines having for apex the camera or the selected camera).

In some embodiments related to FIGS. 3 to 6 and 10, the camera (or the selected camera if there are several cameras) captures images all the time, irrespective of the display (or the selected display if there are several displays) being in the regular display state or in the black-frame display state (even if there is no pyramid drawn in dashed lines having for apex the camera or the selected camera).

Figure 7:
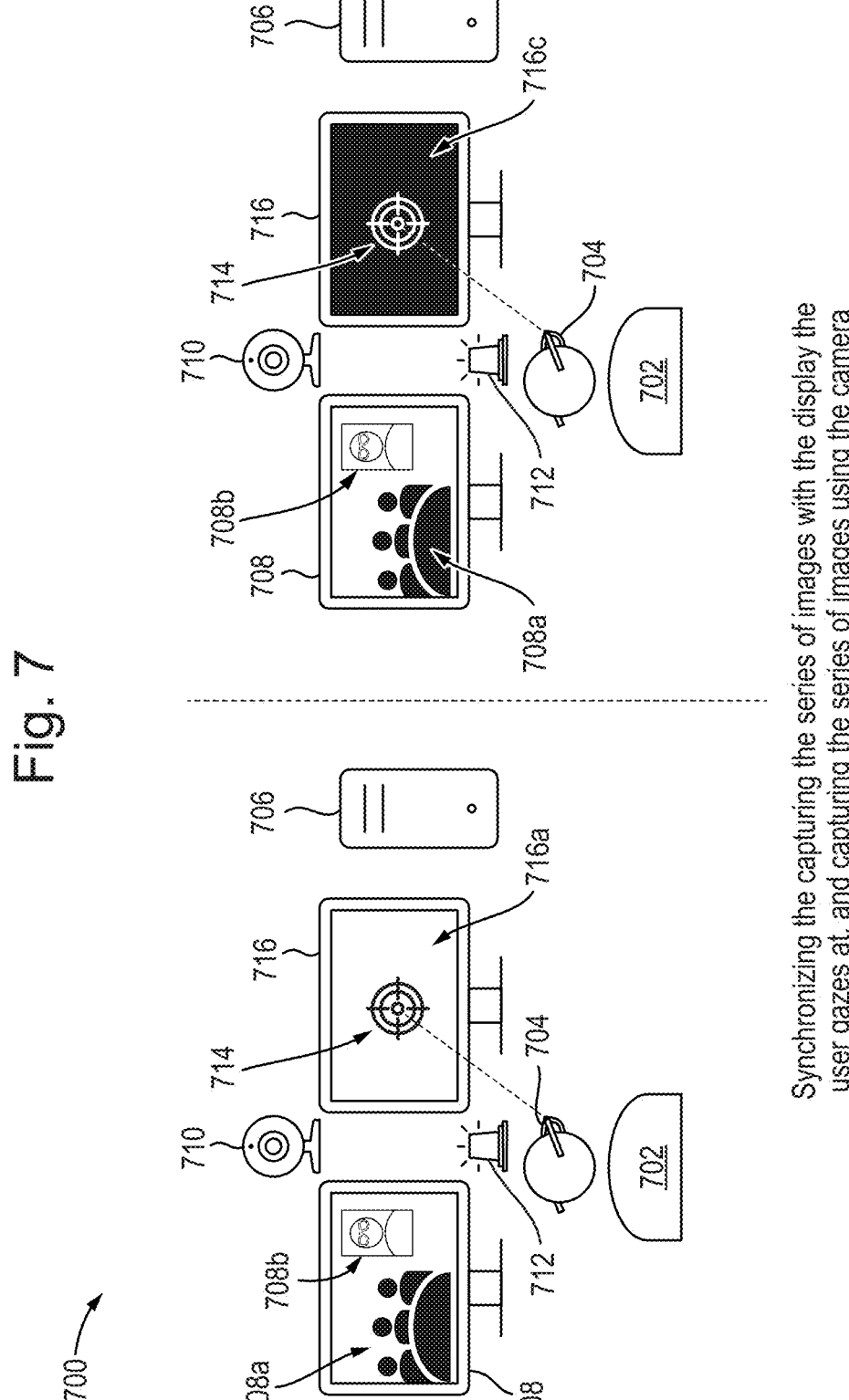
FIG. 7 represents an example of a user device producing a video signal for a video conference, in accordance with some implementations of the disclosure.
Figure 8:
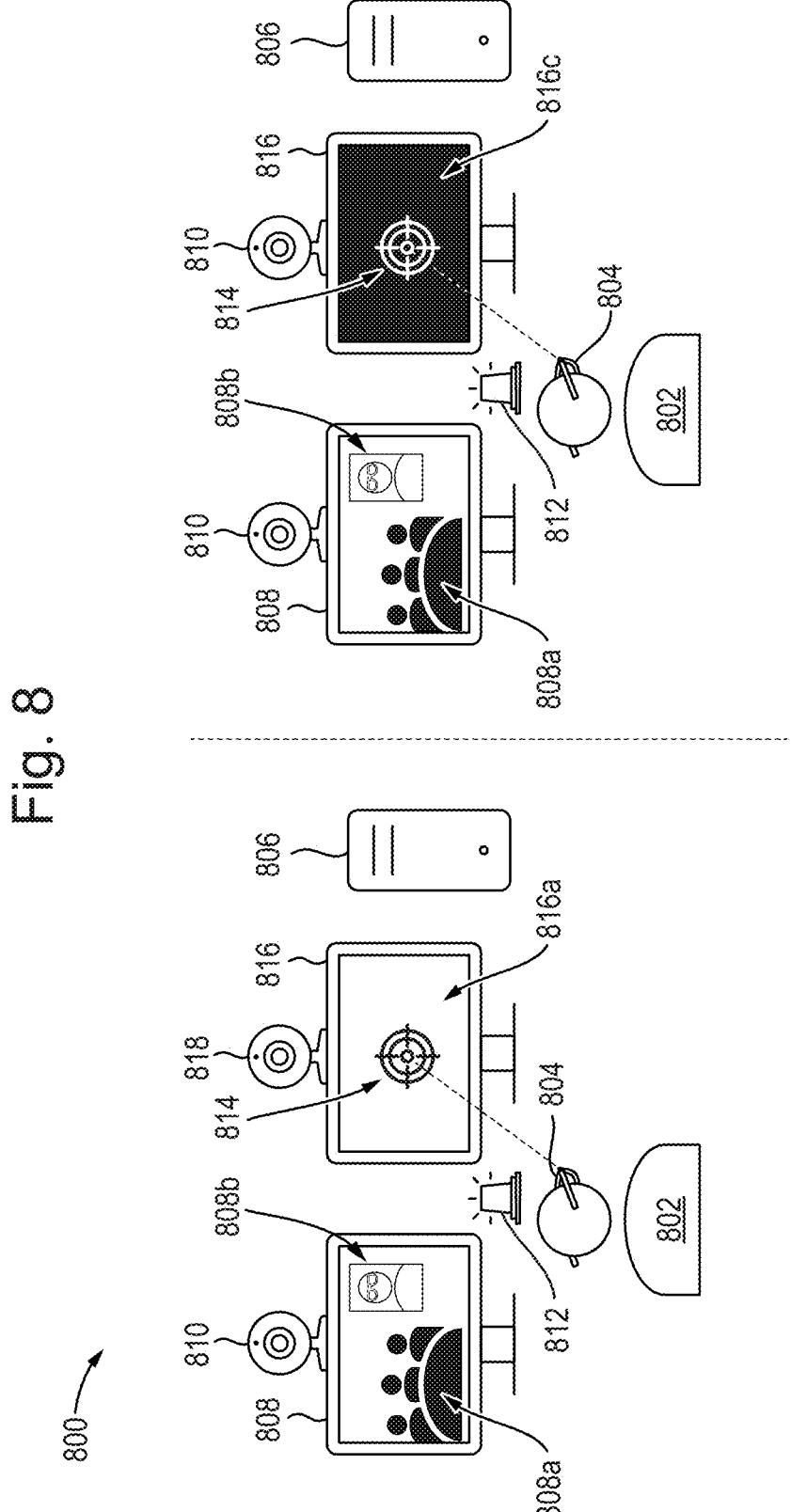
FIG. 8 shows an example of a user device producing a video signal for a video conference, in accordance with some implementations of the disclosure.
Figure 12:
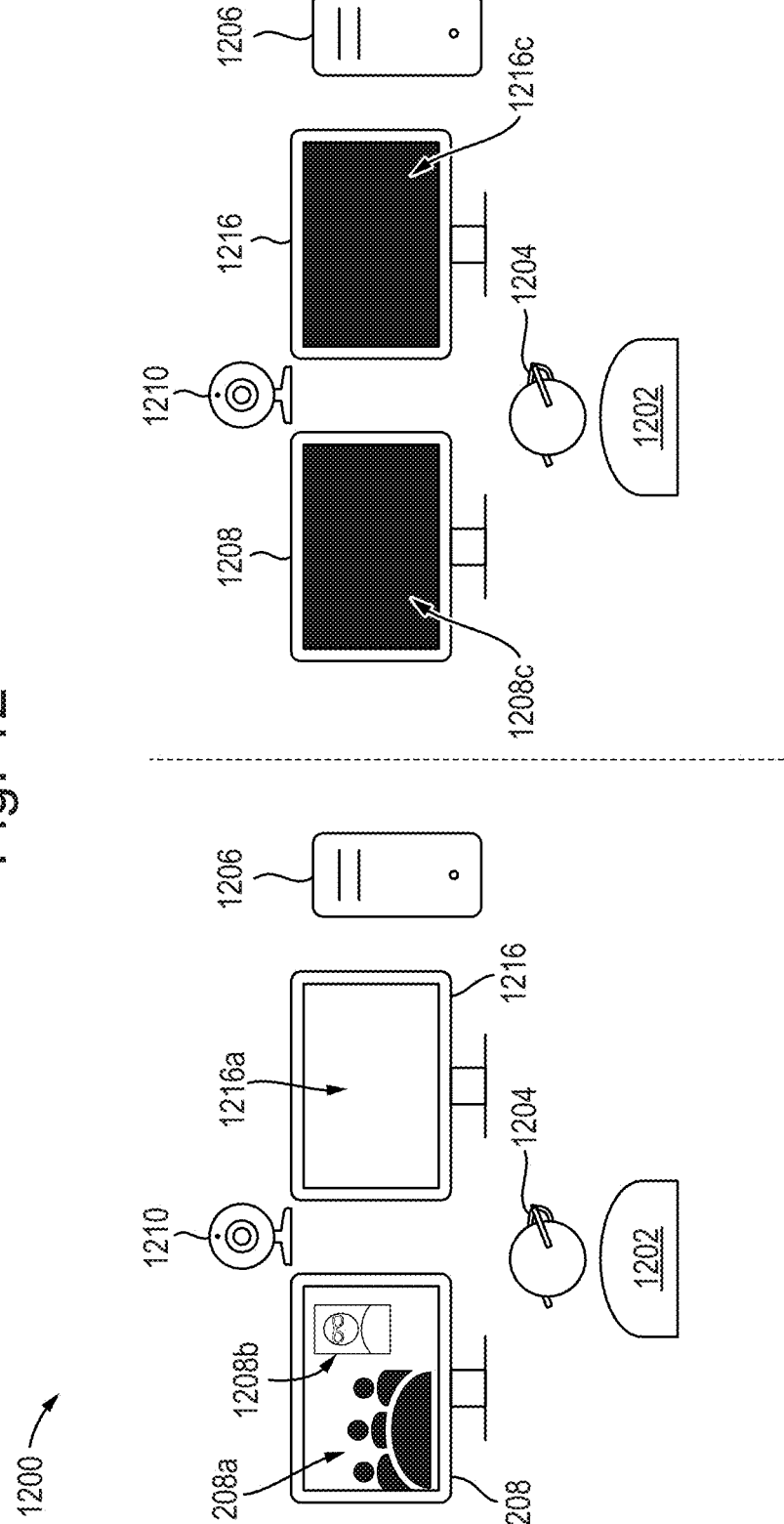
FIG. 12 shows an example of a user device producing a video signal for a video conference, in accordance with some implementations of the disclosure.

In some embodiments related to FIGS. 7, 8 and 12, the camera (or the selected camera if there are several cameras) captures images all the time, irrespective of the display (or the selected display if there are several displays) being in the regular display state or in the black-frame display state (even if there is no pyramid drawn in dashed lines having for apex the camera or the selected camera).

In FIG. 6, the pyramids drawn in dashed lines having for apex the camera do not indicate that the camera captures an image but are simply to illustrate the field of view of the camera whose brightness is being monitored by a light sensor.

Figure 1:
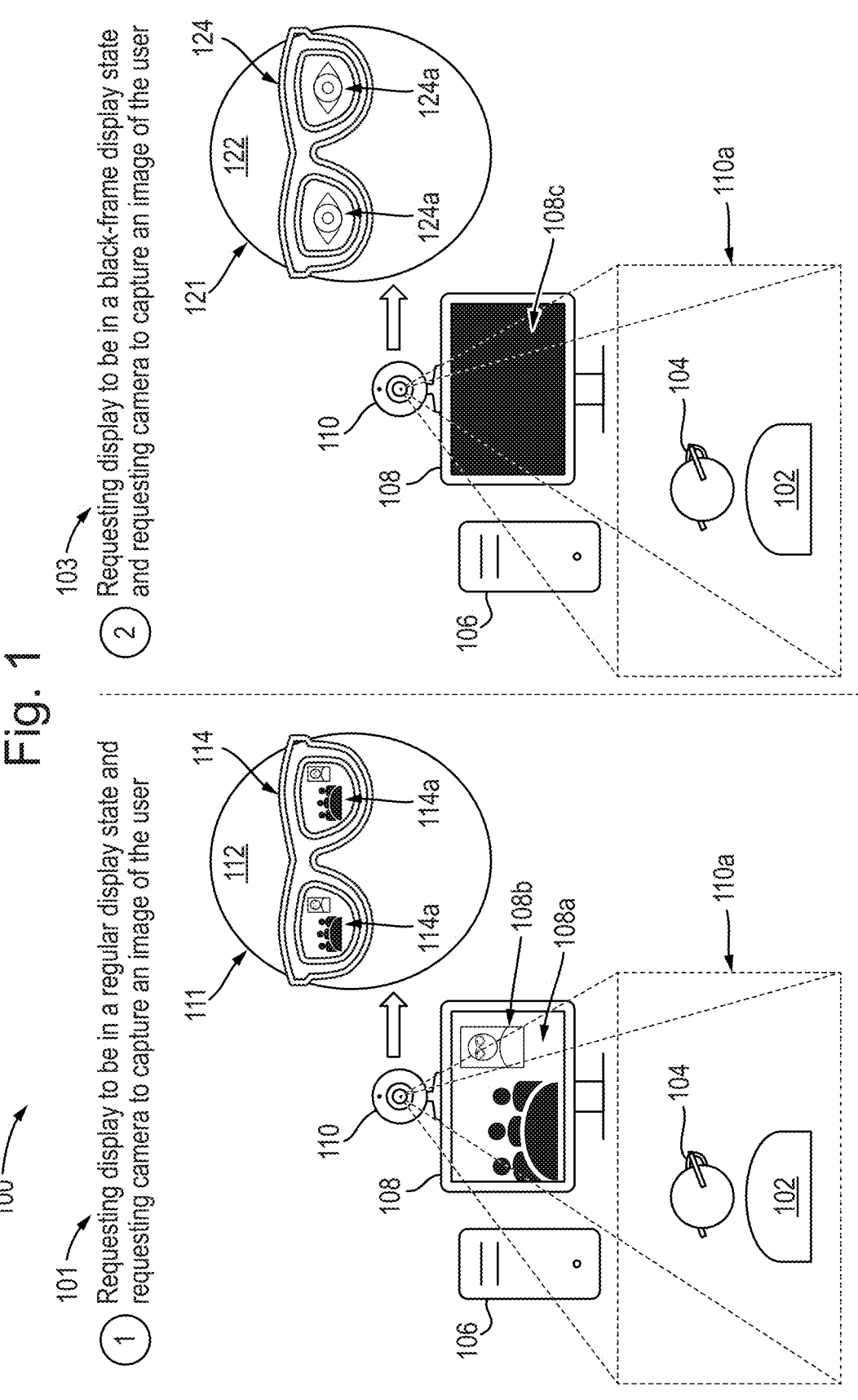
FIG. 1 depicts the steps of an example leading to the generation, by a user device, of a video signal (whose main subject is a user) for a video conference, the video signal depicting a representation of eyeglasses, worn by a representation of a user, reflecting a representation of an image rendered by a display.
Figure 1:
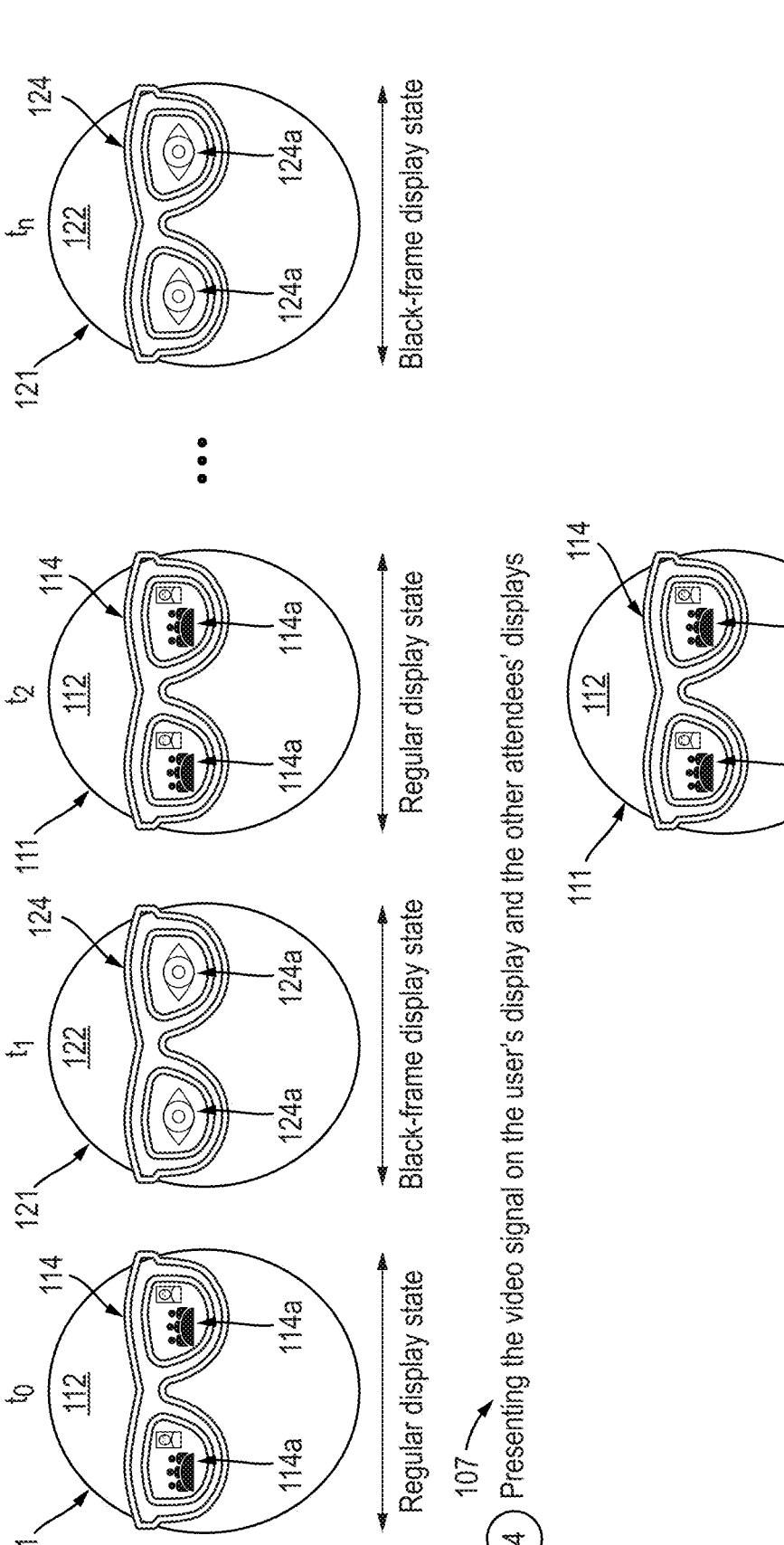

FIG. 1 depicts the steps of an example 100 leading to the generation, by a user device 106, of a video signal (whose main subject is a user 102) for a video conference, the video signal depicting a representation of eyeglasses 104 worn by a representation of a user 102 reflecting a representation of an image 108*a* rendered by a display 108. User 102 wearing eyeglasses 104 attends a video conference in which other attendees participate.

In some embodiments, at step 101, user device 106 requests display 108 to be in the regular display state during which display 108 renders an image 108*a* comprising an image of the video signal (whose main subject is user 102) in an insert 108*b*: eyeglasses 104 reflect image 108*a* rendered by display 108. In some embodiments, at step 101, user device 106 also requests camera 110 to capture an image such that in a portion 111 of the captured image, there is a representation 112 of user 102's face, a representation 114 of eyeglasses 104, and two representations 114*a* of a lens, each representation 114*a* of a lens depicting a reflection of image 108*a* on the lens obstructing a representation of one of the eyes of the user. The capture of an image by camera 110 is illustrated by the pyramid 110*a* (made of dashed lines) whose apex is the aperture of camera 110.

In some embodiments, at step 103, user device 106 requests display 108 to be in the black-frame display state during which display 108 does not emit any light (See black frame 108*c*) such that there is no reflection on eyeglasses 104 obstructing the user's eyes. In some embodiments, at step 103, user device 106 also requests camera 110 to capture an image such that in a portion 121 of the captured image, there is a representation 122 of user 102's face, a representation 124 of eyeglasses 104, and two representations 124*a* of a lens of eyeglasses 104, each representation 124*a* of a lens clearly depicting one of the eyes of the user, unobstructed by a reflection. The capture of an image by camera 110 is illustrated by the pyramid 110*a* (made of dashed lines) whose apex is the aperture of camera 110.

In some embodiments, at step 105, user device 106 appends camera-captured images to form a video signal based on the time (e.g., $t_0$, $t_1$, $t_2$, . . . , $t_n$) at which the camera-captured images were captured by camera 110. As the display keeps alternating between a regular display state and a black-frame display state, the video signal is made of a sequence of images captured during the regular display state and the black-frame display state such that the representation of the user's face in the video signal (as perceived by the user and the other attendees) corresponds to the merging of portion 111 of the captured image and portion 121 of the captured image, which is approximatively equivalent to portion 111 of the captured image. In other words, user 102 and the other attendees perceive each eye of the user as obstructed by the reflection of image 108*a* on eyeglasses 104. In some embodiments, at step 105, user device 106 also stores the video signal for subsequent rendering on display 108 in the insert 108*b* and for subsequent transmitting to a server (after encoding the video signal) so as to be presented on the other attendees' displays.

In some embodiments, at step 107, user device 106 presents the video signal to user 102 in insert 108*b* of display 108. In some embodiments, at step 107, other attendees' displays also present the video signal to the other attendees. User 102 and the other attendees perceive the user's eyes as obstructed by the reflection of image 108a rendered by display 108 on eyeglasses 104, which is exemplified in portion 111 of the captured image.

Figure 2:
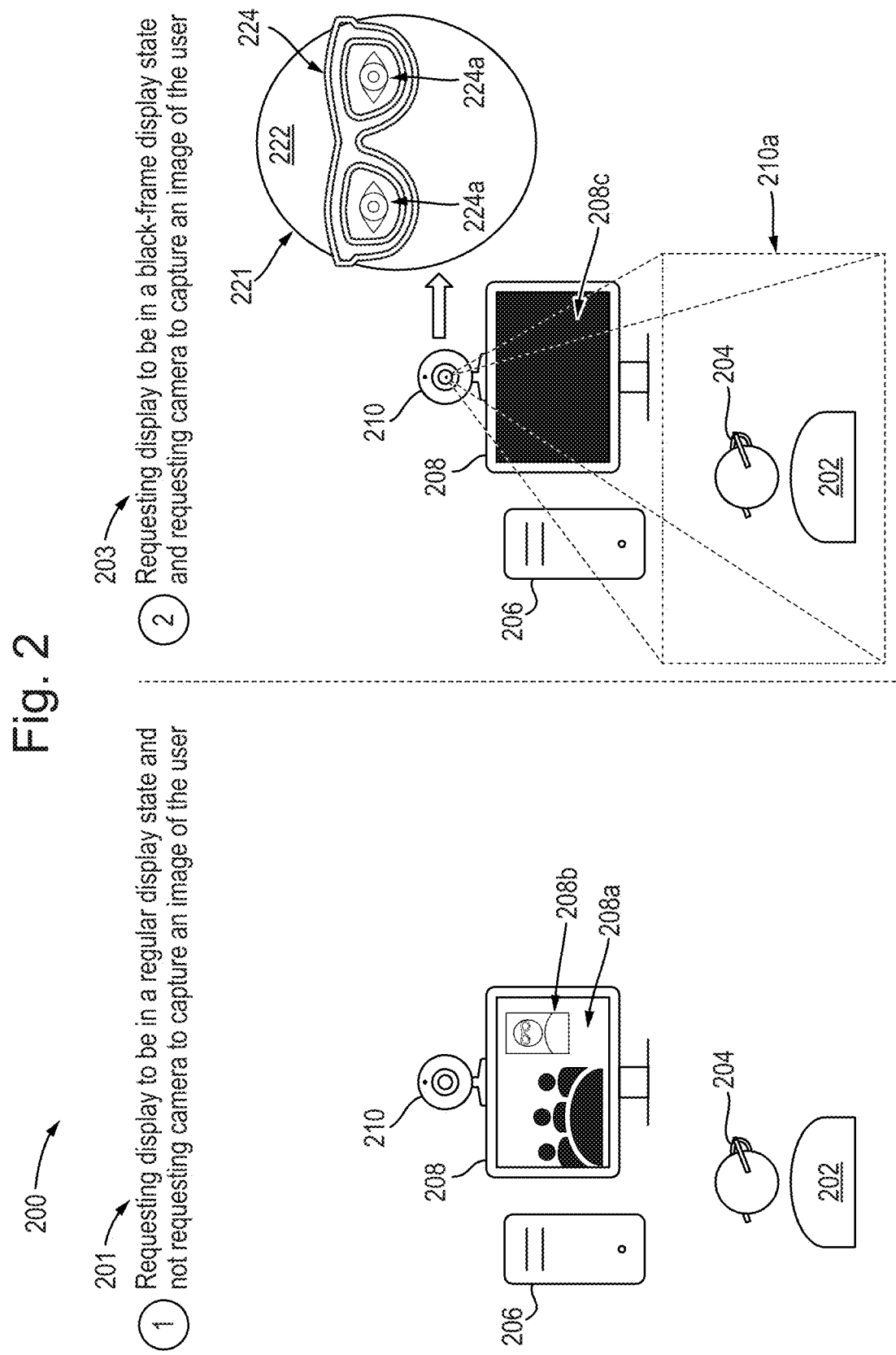
FIG. 2 illustrates the steps of an example, in accordance with some implementations of the disclosure, leading to the generation, by a user device, of a video signal (whose main subject is a user) for a video conference, the video signal depicting a representation of eyeglasses, worn by a representation of a user, through which each representation of an eye of the user is clearly visible.
Figure 2:
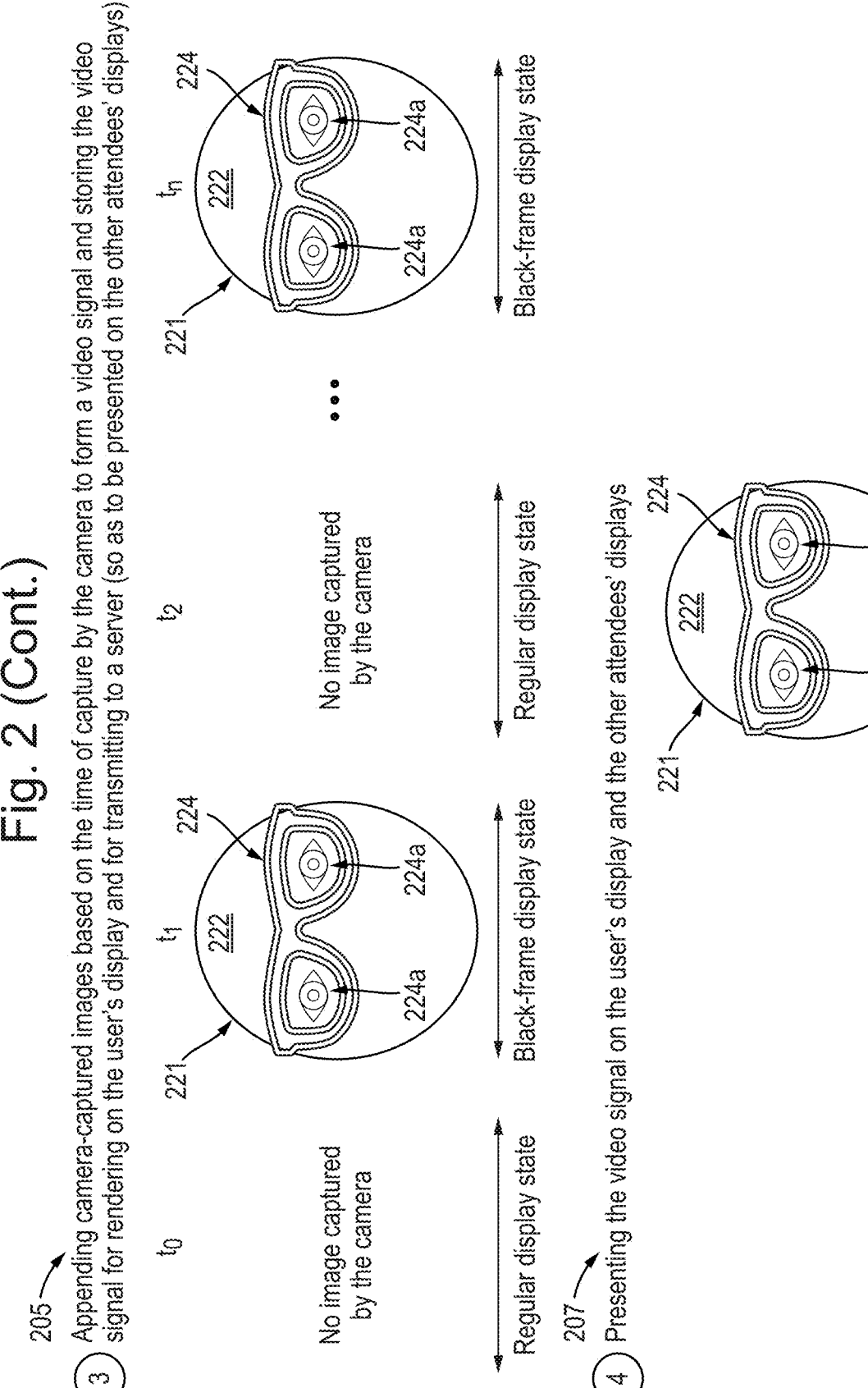

FIG. 2 depicts the steps of an example 200, in accordance with some implementations of the disclosure, leading to the generation, by a user device 206, of a video signal (whose main subject is a user 202) for a video conference, the video signal depicting a representation of eyeglasses 204 worn by a representation of a user 202, through which each representation of an eye of user 202 is clearly visible. User 202 wearing eyeglasses 204 attends a video conference in which other attendees participate.

In some embodiments, at step 201, user device 206 requests display 208 to be in the regular display state during which display 208 renders an image 208a comprising an image of the video signal (whose main subject is user 202) in an insert 208b: eyeglasses 204 reflect image 208a rendered by display 208. In some embodiments, at step 201, user device 206 also does not request camera 210 to capture an image of user 202.

In some embodiments, at step 203, user device 206 requests display 208 to be in the black-frame display state during which display 208 does not emit any light (See black frame 208c) such that there is no reflection on eyeglasses 204 obstructing the user's eyes. In some embodiments, at step 203, user device 206 also requests camera 210 to capture an image such that in a portion 221 of the captured image, there is a representation 222 of user 202's face, a representation 224 of eyeglasses 204, and two representations 224a of a lens of eyeglasses 204, each representation 224a of a lens clearly depicting one of the eyes of the user, unobstructed by a reflection. The capture of an image by camera 210 is illustrated by the pyramid 210a (made of dashed lines) whose apex is the aperture of camera 210.

In some embodiments, at step 205, user device 206 appends camera-captured images to form a video signal based on the time (e.g., $t_0$, $t_1$, $t_2$, . . . , $t_n$) at which the camera-captured images were captured by camera 210. As the display keeps alternating between a regular display state and a black-frame display state, the video signal is made of a sequence of images captured only during the black-frame display state such that the representation of the user's face in the video signal (as perceived by the user and the other attendees) corresponds to portion 221 of the captured image. In other words, user 202 and the other attendees perceive each eye of user 202 as unobstructed by a reflection. In some embodiments, at step 205, user device 206 also stores the video signal for subsequent rendering on display 208 in the insert 208b and for subsequent transmitting to a server (after encoding the video signal) so as to be presented on the other attendees' displays.

In some embodiments, at step 207, user device 206 presents the video signal to user 202 in insert 208b of display 208. In some embodiments, at step 207, other attendees' displays also present the video signal to the other attendees on their respective display. User 202 and the other attendees perceive the user's eyes as unobstructed by a reflection, which is exemplified in portion 221 of the captured image.

Figure 3:
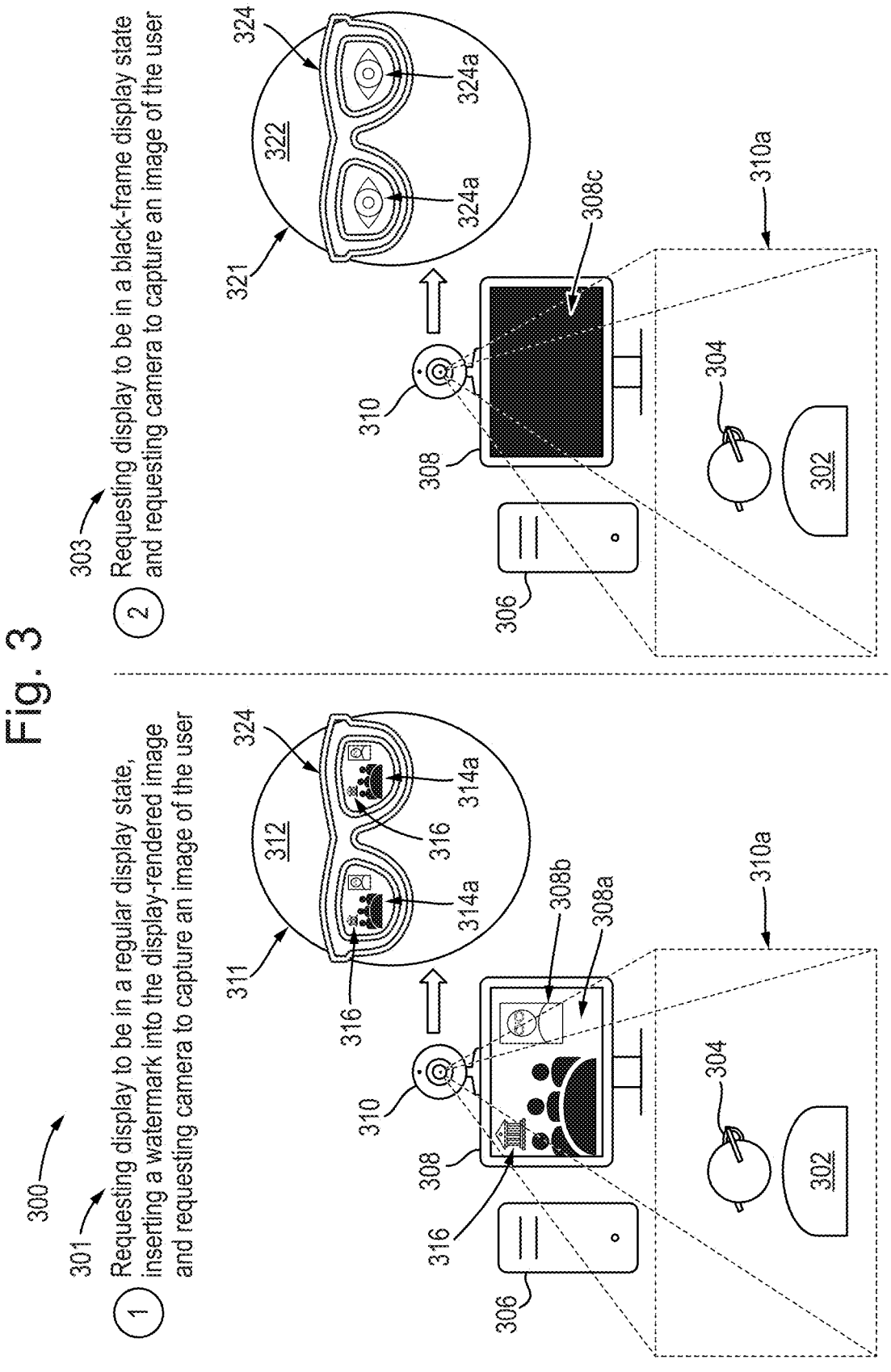
FIG. 3 represents the steps of an example 300, in accordance with some implementations of the disclosure, leading to the generation, by a user device of a video signal (whose main subject is a user) for a video conference, the video signal depicting a representation of eyeglasses, worn by a representation of a user, through which each representation of an eye of user is clearly visible.

FIG. 3 depicts the steps of an example 300, in accordance with some implementations of the disclosure, leading to the generation, by a user device 306 of a video signal (whose main subject is a user 302) for a video conference, the video signal depicting a representation of eyeglasses 304 worn by a representation of a user 302, through which each representation of an eye of user 302 is clearly visible. User 302 wearing eyeglasses 304 attends a video conference in which other attendees participate.

In some embodiments, at step 301, user device 306 requests display 308 to be in the regular display state during which display 308 renders an image 308a comprising an image of the video signal (whose main subject is user 302) in an insert 308b: eyeglasses 304 reflect image 308a rendered by display 308. In some embodiments, at step 301, display 308 also inserts a watermark 316 into image 308a such that eyeglasses 304 also reflect watermark 316. In some embodiments, at step 301, user device 306 also requests camera 310 to capture an image such that in a portion 311 of the captured image, there is a representation 312 of user 302's face, a representation 314 of eyeglasses 304, and two representations 314a of a lens, each representation 314a of a lens depicting watermark 316 and a reflection of image 308a on the lens obstructing a representation of one of the eyes of the user. The capture of an image by camera 310 is illustrated by the pyramid 310a (made of dashed lines) whose apex is the aperture of camera 310.

In some embodiments, at step 303, user device 306 requests display 308 to be in the black-frame display state during which display 308 does not emit any light (See black frame 308c) such that there is no reflection on eyeglasses 304 obstructing the user's eyes. In some embodiments, at step 303, user device 306 also requests camera 310 to capture an image such that in a portion 321 of the captured image, there is a representation 322 of user 302's face, a representation 324 of eyeglasses 304, and two representations 324a of a lens of eyeglasses 304, each representation 324a of a lens clearly depicting one of the eyes of the user, unobstructed by a reflection on eyeglasses 304. The capture of an image by camera 310 is illustrated by the pyramid 310a (made of dashed lines) whose apex is the aperture of camera 310.

In some embodiments, at step 305, user device 306 removes the images captured by camera 310 when display 308 was in the regular display state by identifying the presence or absence of watermark 316 using a machine learning model. In some embodiments, non-transitory computer-readable instructions stored on a non-transitory computer readable medium and executed by control circuitry of the user device comprise instructions to control the machine learning model identifying the presence and/or the absence of a watermark.

In some embodiments, at step 307, user device 306 appends the images captured by camera 310 when display 308 was in the black-frame display state (i.e. deprived of watermark 316) to form a video signal based on the time (e.g., $t_1$, $t_3$, . . . , $t_{2n+1}$) at which the camera-captured images were captured by camera 310. The video signal is made of a sequence of images captured during the black-frame display state such that the representation of the user's face in the video signal (as perceived by the user and the other attendees) corresponds to portion 321 of the captured image. In other words, user 302 and the other attendees perceive each eye of the user as unobstructed by a reflection on eyeglasses 304. In some embodiments, at step 307, user device 306 also stores the video signal for subsequent rendering on display 308 in the insert 308b and for subsequent transmitting to a server (after encoding the video signal) so as to be presented on the other attendees' displays.

In some embodiments, at step 309, user device 306 presents the video signal to user 302 in insert 308b of display 308. In some embodiments, at step 309, other attendees' displays also present the video signal to the other attendees.

User 302 and the other attendees perceive the user's eyes as unobstructed by a reflection on eyeglasses 304, which is exemplified in portion 321 of the captured image.

Figure 4:
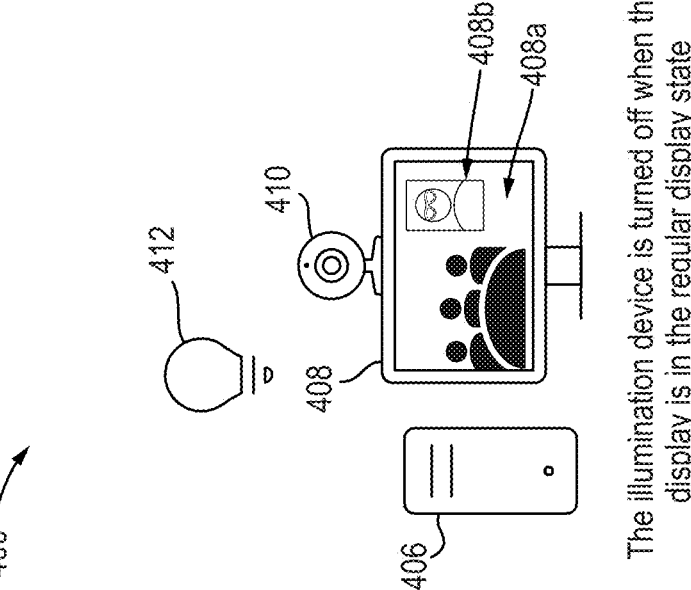
FIG. 4 shows components of an example for producing a video signal for a video conference, in accordance with some implementations of the disclosure.

FIG. 4 shows components of an example 400 for producing a video signal for a video conference, in accordance with some implementations of the disclosure. Example 400 comprises a user device 406, a display 408 that alternates between a regular display frame and black-frame display state, a camera 410 and an illumination device 410. In some embodiments, example 400 is used to implement the steps of e.g., example 200 or example 300.

In some embodiments, when display 408 is in the regular display state, display 408 renders image 408*a* comprising an image of the video signal (whose main subject is a user attending a video conference in which participate other attendees) in an insert 408*b* while an illumination device 412 is off i.e., illumination device 412 does not illuminate at least a portion of the field of view of camera 410. In some embodiments, when display 408 is in the black-frame display state, display 408 does not emit any light (See black frame 408*c*) while illumination device 412 is on i.e., illumination device 412 illuminates at least a portion of the field of view of camera 410.

If display 408 were to be the only available light, when display 408 switches to the black-frame display state, the field of view of camera 410 would be completely dark and so would be any image captured during the black-frame display state. This situation is equivalent to having the user not recorded on camera. Hence the point of having illumination device 412 is to sufficiently illuminate at least a portion of the field of view of camera 410 such that the user and their eyes are clearly visible on the video signal to the user themselves and the other attendees.

In some embodiments, illumination device 412 is in communication with user device 406 via a communication network or a wired connection In some embodiments, non-transitory computer-readable instructions stored on a non-transitory computer readable medium and executed by the control circuitry of user device 406 comprise instructions to control (e.g., enable, disable or tune the brightness, produced by the illumination device, in at least a portion of the field of view of camera 410) the illumination device based on the alternating of the at least one display between the regular display state and the black-frame display state.

Figure 5:
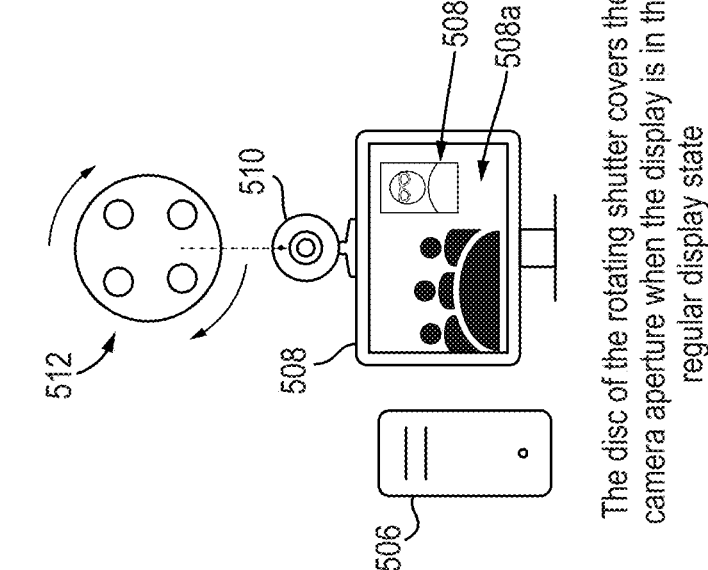
FIG. 5 depicts an example of a user device producing a video signal for a video conference, in accordance with some implementations of the disclosure.

FIG. 5 shows components of an example 500 for producing a video signal for a video conference, in accordance with some implementations of the disclosure. Example 500 comprises a user device 506, a display 508 that alternates between a regular display frame and black-frame display state, a camera 510 and a rotating shutter 512. In some embodiments, example 500 is used to implement the steps of e.g., example 200 or example 300. In some embodiments, example 500 is used in combination with example 400 to implement the steps of e.g., example 200 or example 300.

In some embodiments, rotating shutter 512 is a disc presenting holes on the rim of the disc such that the distance between two consecutive holes corresponds to the product of the disc rotation velocity and the period during which display 508 is in the regular display state (as the aperture of camera 510 should remain obstructed when display 508 is in a regular display state). Hole of rotating shutter 521 aligns with the aperture of camera 510 when display 508 is in the black-frame display state.

In some embodiments (e.g., when example 500 is used to implement the steps of example 200 in combination or not with example 400), when display 508 is in the regular display state, display 508 renders image 508*a* comprising an image of the video signal (whose main subject is a user attending a video conference in which participate other attendees) in an insert 508*b* while rotating shutter 512 covers an aperture of camera 510 so as to prevent camera 510 from capturing an image. In some embodiments (e.g., when example 500 is used to implement the steps of example 300 in combination or not with example 400), when display 508 is in the regular display state, display 508 renders image 508*a* comprising an image of the video signal (whose main subject is a user attending a video conference in which other attendees participate) in an insert 508*b* while rotating shutter 512 covers an aperture of camera 510 so as to prevent camera 510 from capturing an image other than a completely dark image wherein nothing can be distinguished. Any completely dark image can be identified by a machine learning model and removed from the captured series of images. (In this case, there is no need to insert a watermark as in example 300.) In some embodiments, when display 508 is in the black-frame display state, display 508 does not emit any light (See black frame 508*c*) while rotating shutter 512 leaves the aperture of camera 510 uncovered such that an image can be captured by camera 510 and this image can clearly depict the user and the user's eyes.

In some embodiments, rotating shutter 512 is in communication with user device 506 via a communication network or a wired connection. In some embodiments, non-transitory computer-readable instructions stored on a non-transitory computer readable medium and executed by control circuitry of the user device comprise instructions to control (e.g., disable, enable or set the rotation velocity of the rotating shutter) rotating shutter 512 based on the alternating of the at least one display between the regular display state and the black-frame display state.

The point of rotating shutter 512 is to control the ability of camera 510 to capture images depending on the display state (e.g., regular display state or black-frame display state) in which display 510 is.

FIG. 6 shows components of an example 600 for producing a video signal for a video conference, in accordance with some implementations of the disclosure. Example 600 comprises a user device 606, a display 608 that alternates between a regular display frame and black-frame display state, a camera 610 and a light sensor 612. In some embodiments, example 600 is used to implement the steps of e.g., example 200 or example 300. In some embodiments, example 600 is used in combination with at least one of examples 400 and 500 to implement the steps of e.g., example 200 or example 300.

In some embodiments, when display 608 is in the regular display state, display 608 renders image 608*a* comprising an image of the video signal (whose main subject is a user attending a video conference in which other attendees participate) in an insert 608*b*, while light sensor 612 monitors the brightness in at least a portion of the field of view of camera 610. In some embodiments, when display 608 is in the black-frame display state, display 508 does not emit any light (See black frame 608*c*) while light sensor 612 monitors the brightness in at least a portion of the field of view of camera 610.

In some embodiments, light sensor 612 is a photoelectric effect-based sensor (e.g., photodiode) able to measure the brightness changes in at least a portion of the field of view of camera 610 that occur to display 608 switching between the regular display state and the black-frame display state. When display switches from the regular display state to the black-frame display state, there is a brightness decrease in the field of view of camera 610. When display switches from the black-frame display state to the regular display state, there is a brightness increase in the field of view of camera 610. The point of light sensor 612 is to announce to user device 606 when display switches between the regular display state and the black-frame display state. This option is of interest when user device 606 is not (or not anymore) in communication with display 608, in order for camera 610 to know accurately when to capture or stop capturing images.

In some embodiments, light sensor 612 is in communication with user device 606 via a communication network or a wired connection. In some instances, non-transitory computer-readable instructions stored on a non-transitory computer readable medium and executed by the control circuitry of user device 606 comprise instructions to control (e.g., enable, disable, calibrate the light sensor using an illumination device able to produce a variety of known brightness levels, access brightness readings from the light sensor) light sensor 612.

The pyramid 610*b* (drawn in dashed lines) having for apex the camera does not indicate that the camera captures an image but are simply to illustrate the field of view of the camera whose brightness is being monitored by light sensor 612.

FIG. 7 shows components of an example 700 for producing a video signal for a video conference, in accordance with some implementations of the disclosure. Example 700 comprises a user device 706, a first display 708 and a second display 716 (each of first display 708 and second display 716 alternates between a respective regular display frame and respective black-frame display state), a camera 710, an eye-tracking device 712 placed in front of a user 702 wearing eyeglasses 704 such that eye-tracking device 712 faces the user's eyeglasses 704 and thus the user's eyes. In some embodiments, example 700 is used to implement the steps of e.g., example 200. In some embodiments, example 700 is used in combination with at least one of examples 400, 500 and 600 to implement the steps of e.g., example 200.

In some instances, eye-tracking device 712 is a standalone device located in front of user 702. In some instances, eye-tracking device 712 is mounted on the user's eyeglasses 704. In some instances, eye-tracking device 712 is integrated within the user's eyeglasses 704. In some instances, eye-tracking device 712 is mounted on camera 710. In some instances, the eye-tracking device is integrated within camera 710.

In some embodiments, eye-tracking device 712 determines whether the user gazes at first display 708 or second display 716 in order to select the display with which user device 706 synchronizes the capturing the series of images. Alternatively, eye-tracking 712 device determines whether the user's gaze is directed closer to first display 708 or second display 716 in order for user device 706 to synchronize the capturing the series of images with first display 708 or second display 716, respectively. Crosshairs 714 indicates where user 702 gazes at.

In some embodiments, eye-tracking device 712 comprises an infrared light emitter and an infrared light sensor. The infrared light emitter emits an infrared light (e.g., continuously or through pulses) towards a retina of the at least one eye that reflects the infrared light in a given direction, which is then captured by the infrared light sensor. The given direction of the reflected infrared light indicates where the user gazes at. In some instances, eye-tracking device 712 is in communication with user device 706 via a communication network or a wired connection. In some instances, non-transitory computer-readable instructions stored on a non-transitory computer readable medium and executed by the control circuitry of user device 706 comprise instructions to control (e.g., enable, disable, forward results from eye-tracking device 712 to user device 706) eye-tracking device 712.

In some embodiments, when a user 702 has two displays (first display 708 and second display 716) and one camera (first camera 710) at disposal during a video conference, user 702 usually directs their gaze towards one of the two displays (first display 708 or second display 716). To do so, user 702 usually rotates their head to gaze at the display of interest, rather than moving their eyes. Eye-tracking device 712 determines which display (first display 708 or second display 716) user 702 gazes at and user device 706 synchronizes the capturing the series of images with the display gazed at i.e., the user-selected display. The head rotation changes the orientation of eyeglasses 704 worn by user 702 such that eyeglasses 704 are to preferentially reflect the image 716*a* rendered by the user-selected display (second display 716) rather than the image 708*a* rendered by the display 708 that the user does not gaze at. The reflection of the image 716*a* rendered by second display 716 (they gaze at) on eyeglasses 704 is eliminated by capturing images only when second display 716 is in the black-frame display state (See black frame 716*c*). The reflection of the image 708*a* rendered by first display 708 the user does not gaze at, on the user's eyeglasses 704, is negligible if not absent. The insert 708*b* presents the video signal based on the image captured by camera 710 and image 716*c* rendered by user-selected display (i.e., second display 716) is a black frame indicating that second display 716 is in the black-frame display state.

In some embodiments, example 700 is used to implement the steps of e.g., example 300. User device 706 synchronizes the capturing of the series of images with first display 708 or second display 716 (alternating between a respective regular display state and a respective black-frame display state), based on the selection operated by the user's gaze (using eye-tracking device 712). However, the capturing of the series of images is to occur at all times, irrespective of the display state in which the user-selected display is. This is to facilitate, during the processing of the captured images, the discrimination between images captured when the user-selected display is in the black-frame display state and images captured when the user-selected display is in the regular display state. The video signal is to be based exclusively on images captured when the user-selected display is in the black-frame display state.

In some embodiments, example 700 is used to implement the steps of e.g., example 300. User device 706 does not synchronize the capturing of the series of images with first display 708 or second display 716 (alternating between a respective regular display state and a respective black-frame display state), based on the selection operated by the user's gaze (using eye-tracking device 712). In this case, there is no need to use eye-tracking device 712. And the capturing of the series of images is to occur at all times, irrespective of the display state in which the first display 708 is and irrespective of the display state in which the second display 716 is. The video signal is to be based exclusively on images depicting no problematic reflection on the user's eyeglasses.

FIG. 8 shows components of an example 800 for producing a video signal for a video conference, in accordance with some implementations of the disclosure. Example 800 comprises a user device 806, a first display 808 and a second display 816 (each of the first display and second display alternates between a respective regular display frame and respective black-frame display state), a first camera 810, a second camera 818, an eye-tracking device 812 placed in front of a user 802 wearing eyeglasses 804 such that eye-tracking device 812 faces the user's eyeglasses 804 and thus the user's eyes. In some embodiments, example 800 is used to implement the steps of e.g., example 200. In some embodiments, example 800 is used in combination with at least one of examples 400, 500 and 600 to implement the steps of e.g., example 200.

In some instances, eye-tracking device 812 is a standalone device located in front of user 802. In some instances, eye-tracking device 812 is mounted on the user's eyeglasses 804. In some instances, eye-tracking device 812 is integrated within the user's eyeglasses 804. In some instances, eye-tracking device 812 is mounted on first camera 810 or second camera 818. In some instances, eye-tracking device 812 is made of two eye-tracking sub-devices working in tandem, each sub-device mounted on one of the cameras. In some instances, eye-tracking device 812 is integrated within first camera 810 or first camera 818. In some instances, eye-tracking device 812 is made of two eye-tracking sub-devices working in tandem, each sub-device integrated within one of the cameras.

In some embodiments, eye-tracking device 812 determines whether the user gazes at first display 808 or second display 816 in order to select the display with which user device 806 synchronizes the capturing the series of images. Alternatively, eye-tracking 812 device determines whether the user's gaze is directed closer to first display 808 or second display 816 in order for user device 806 to synchronize the capturing the series of images with first display 808 or second display 816, respectively. Crosshairs 814 indicates where user 802 gazes at.

In some embodiments, eye-tracking device 812 comprises an infrared light emitter and an infrared light sensor. The infrared light emitter emits an infrared light (e.g., continuously or through pulses) towards a retina of the at least one eye that reflects the infrared light in a given direction, which is then captured by the infrared light sensor. The given direction of the reflected infrared light indicates where the user gazes at. In some instances, eye-tracking device 812 is in communication with user device 806 via a communication network or a wired connection. In some instances, non-transitory computer-readable instructions stored on a non-transitory computer readable medium and executed by the control circuitry of user device 806 comprise instructions to control (e.g., enable, disable, forward results from eye-tracking device 812 to user device 806) eye-tracking device 812.

In some embodiments, when a user has two displays (first display 808 and second display 816) and two cameras (first camera 810 and second camera 818) at disposal during a video conference, user 802 usually directs their gaze towards one of the two displays (first display 808 or second display 816). To do so, user 802 usually rotates their head to gaze at the display of interest, rather than moving their eyes. Eye-tracking device 812 determines which display (first display 808 or second display 816) user 802 gazes at and user device 806 synchronizes the capturing the series of images with the display gazed at i.e., the user-selected display, which is, in FIG. 8, second display 816. The head rotation changes the orientation of eyeglasses 804 worn by user 802 such that eyeglasses 804 are to preferentially reflect the image 816a rendered by the user-selected display (second display 816) rather than the image 808a rendered by first display 808 (at which the user does not gaze). The reflection of the image 816a rendered by second display 816 (at which the user gazes) on eyeglasses 804 is eliminated by having the capturing the series of images occur when the user-selected display, second display 816, is in the black-frame display state. The reflection of the image 808a rendered by first display 808 (the user does not gaze at), on the user 802's eyewear 804, is negligible if not absent. The insert 808b presents the video signal based on the images captured by second camera 818 and image 816c rendered by user-selected display, second display 816, is a black frame indicating that second display 816 is in the black-frame display state.

The camera to capture the series of images when the display has been selected by user 802 is the one that allows for capturing images depicting the user's face wherein the user's at least one eye is to occupy the largest area proportionally to the captured image size, which is, in FIG. 8, second camera 818. In other words, the aperture of the selected camera (when considering that the aperture of the camera is fixed in space), second camera 818, is to be located the closest to the user-selected display, second display 816. This configuration ensures that the user 802's face is always captured by the camera having the most detailed view of the user's at least one eye, which is of utmost importance for a video conference.

However, this configuration may lead to frequent changes of perspectives, which may disturb the other attendees and the user. In some embodiments, user device 806 determines a threshold, the lowest number of changes of perspectives per a time unit ($t_{unit}$) below which the disturbance related to frequent changes of perspectives is not caused, and from and above which this disturbance is caused, for each attendee of the video conference by analyzing the facial expressions of the user and the other attendees. In some embodiments, user device 806 then extracts the minimum threshold value from the threshold values determined for each attendee. In some embodiments, when the minimum threshold value is reached after a time $t_{mtv}$, the camera (e.g., first camera 810 or second camera 818) to capture the series of images remains the camera (e.g., first camera 810 or second camera 818) to capture the series of images at time $t_{mtv}$ until the time gap corresponding to ($t_{unit}-t_{mtv}$) has passed. After the time gap has passed, the camera (e.g., first camera 810 or second camera 818) to capture the series of images when the display (e.g., first display 808 or second display 816) has been selected by the user is again the one that allows for capturing images depicting the user's face wherein the user's at least one eye is to occupy the largest area proportionally to the captured image size.

In some embodiments, non-transitory computer-readable instructions stored on a non-transitory computer readable medium and executed by control circuitry of user device 806 comprise instructions to control a machine learning model able to analyze the facial expressions of user 802 and the other attendees (so as to determine whether user 802 and the other attendees are subjected to a disturbance caused by frequent changes of perspectives), to determine the threshold value for each video conference attendee and the minimum threshold value, and to select which camera (e.g., first camera 810 or second camera 818) is to capture the series of images at any given time.

In some embodiments, example 800 is used to implement the steps of e.g., example 300. User device 806 synchronizes the capturing of the series of images with first display 808 or second display 816 (alternating between a respective regular display state and a respective black-frame display state), based on the selection operated by the user's gaze (using eye-tracking device 812). However, the capturing of the series of images is to occur at all times, irrespective of the display state in which the user-selected display is. This is to facilitate, during the processing of the captured images, the discrimination between images captured when the user-selected display is in the black-frame display state and images captured when the user-selected display is in the regular display state. And the camera to be capturing the series of images is to be the closest camera (first camera 810 or second camera 818) to the user-selected display (first display 808 or second display 816) while enabling the possibility to limit the amount of changes of perspectives (as mentioned earlier). After processing of the captured images, the video signal is to be based exclusively on images captured when the user-selected display is in the black-frame display state.

In some embodiments, example 800 is used to implement the steps of e.g., example 300. User device 806 does not synchronize the capturing of the series of images with first display 808 or second display 816 (alternating between a respective regular display state and a respective black-frame display state), based on the selection operated by the user's gaze (using eye-tracking device 812). In this case, there is no need to use eye-tracking device 812. And the capturing of the series of images is to occur at all times by both first camera 810 and second camera 818, irrespective of the display state in which the first display 808 is and irrespective of the display state in which the second display 816 is. After processing of the captured images, the video signal is to be based exclusively on images depicting no problematic reflection on the user's eyeglasses.

Figure 9:
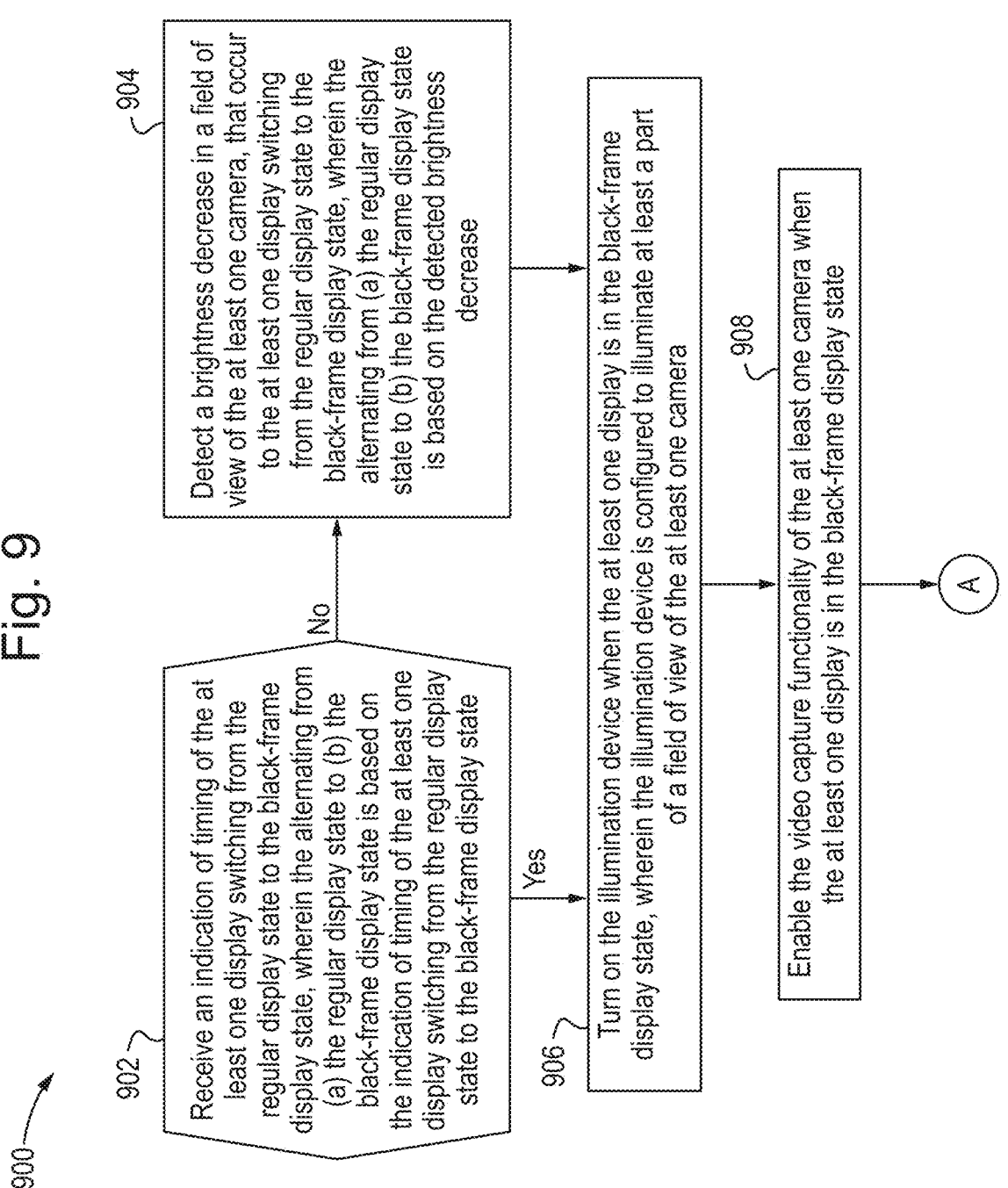
FIG. 9 depicts a flowchart describing an example for producing a video signal for a video conference, in accordance with some implementations of the disclosure.

FIG. 9 depicts a flowchart describing an example 900 for producing a video signal for a video conference, in accordance with some implementations of the disclosure.

Figure 11:
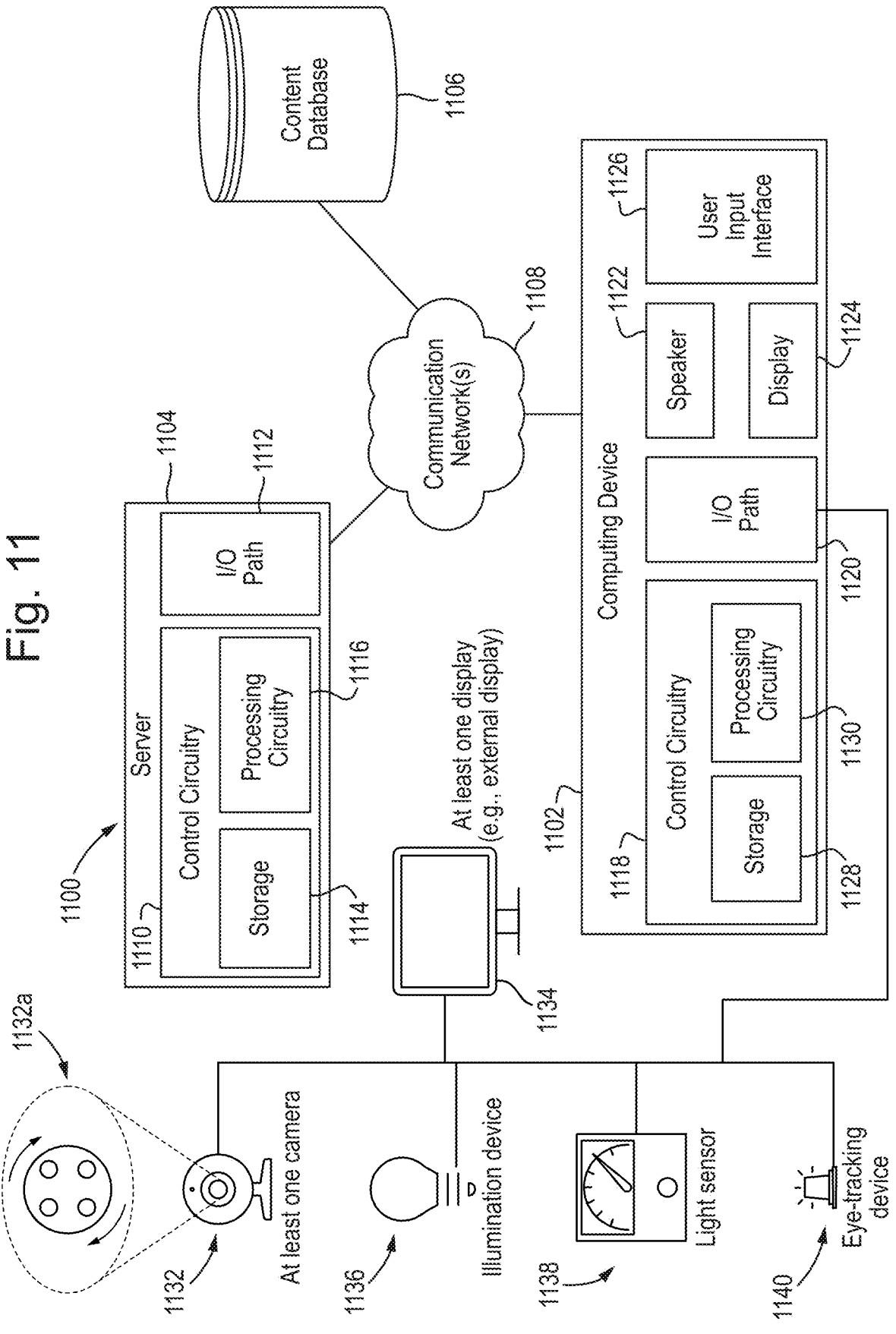
FIG. 11 illustrates a block diagram showing components of an example for producing a video signal for a video conference, in accordance with some implementations of the disclosure.

In some embodiments, at step 902, the control circuitry of the user device (e.g., control circuitry of user devices 206, 406 to 806 and 1206, or control circuitry 1118 of computing device 1102 in FIG. 11) receives, via the Input/Output path of the user device (e.g., I/O path 1120 of computing device 1102 in FIG. 11), an indication of timing of the at least one display (e.g., display 208, 408, 508, 608, 708, 716, 808, 816, 1124, 1134, 1208 or 1216) switching from the regular display state to the black-frame display state, wherein the alternating from (a) the regular display state to (b) the black-frame display state is based on the indication of timing of the at least one display switching from the regular display state to the black-frame display state. If the control circuitry of the user device does not receive, via the Input/Output path of the user device, an indication of timing of the at least one display switching from the regular display state to the black-frame display state, the control circuitry of the user device proceeds to step 904. If the control circuitry of the user device receives, via the Input/Output path of the user device, an indication of timing of the at least one display switching from the regular display state to the black-frame display state, the control circuitry of the user device proceeds to step 906.

In some embodiments, at step 904, the control circuitry of the user device detects a brightness decrease in a field of view of the at least one camera (e.g., camera 210, 410, 510, 610, 710, 810, 818, 1132 or 1210), that occurs to the at least one display switching from the regular display state to the black-frame display state, wherein the alternating from (a) the regular display state to (b) the black-frame display state is based on the detected brightness decrease. In some embodiments, at step 904, the control circuitry of the user device uses a light sensor (e.g., light sensor 612 in FIG. 6, light sensor 1138 in FIG. 11) such as a photoelectric effect-based sensor to measure the brightness in at least a portion of the field of view of the at least one camera and receives the brightness measurement readings via the I/O path of the user device. In some embodiments, at step 904, the light sensor is in communication with the user device via a communication network or a wired connection. In some embodiments, at step 904, non-transitory computer-readable instructions stored on a non-transitory computer readable medium and executed by the control circuitry of user device comprise instructions to control (e.g., enable, disable, calibrate the light sensor using an illumination device able to produce a variety of known brightness levels, forward brightness readings from the light sensor to the user device) the light sensor. Afterwards, control circuitry of user device proceeds to step 906.

In some embodiments, at step 906, control circuitry of the user device turns on, via the I/O path of the user device, an illumination device (e.g., illumination device 412 in FIG. 4, illumination device 1136 in FIG. 11) when the at least one display is in the black-frame display state, wherein the illumination device is configured to illuminate at least a portion of the field of view of the at least one camera. In some embodiments, at step 906, the illumination device is in communication with user device via a communication network or a wired connection. In some embodiments, at step 906, non-transitory computer-readable instructions stored on a non-transitory computer readable medium and executed by the control circuitry of the user device comprise instructions to control (e.g., enable, disable or tune the brightness, produced by the illumination device, in at least a portion of the field of view of the at least one camera) the illumination device based on the alternating of the at least one display between the regular display state and the black-frame display state.

In some embodiments, at step 908, control circuitry of the user device enables the video capture functionality of the at least one camera when the at least one display is in the black-frame display state. In some embodiments, at step 908, the user device is in communication with the at least one camera (e.g., webcam) via a communication network (e.g., LAN or WAN—See communication network 1108 in FIG. 11) or a wired connection. In some embodiments, at step 908, non-transitory computer-readable instructions stored on a non-transitory computer readable medium and executed by control circuitry of the user device comprise instructions to control (e.g., disable or enable) the video capture functionality of the at least one camera based on the alternating of the at least one display between the regular display state and the black-frame display state.

In some embodiments, at step 910, control circuitry of user device requests the at least one camera to capture a series of images, wherein each image of the series of images includes a depiction of a reflective surface (e.g., eyeglasses 204, 704, 804 or 1204) via the Input/Output path of the user device (e.g., I/O path 1120 of computing device 1102 in FIG. 11).

In some embodiments, at step 912, the control circuitry of the user device receives, via the Input/Output path of the user device, an indication of timing of the at least one display switching from the black-frame display state to the regular display state, wherein the alternating from (a) the black-frame display state to (b) the regular display state is based on the indication of timing of the at least one display switching from the black-frame display state to the regular display state. If the control circuitry of the user device does not receive, via the Input/Output path of the user device, an indication of timing of the at least one display switching from the black-frame display state to the regular display state, the control circuitry of the user device proceeds to step 914. If the control circuitry of the user device receives, via the Input/Output path of the user device, an indication of timing of the at least one display switching from the black-frame display state to the regular display state, the control circuitry of the user device proceeds to step 916.

In some embodiments, at step 914, the control circuitry of the user device detects a brightness increase in a field of view of the at least one camera, that occurs to the at least one display switching from the black-frame display state to the regular display state, wherein the alternating from (a) the black-frame display state to (b) the regular display state is based on the detected brightness increase. In some embodiments, at step 914, the control circuitry of the user device uses a light sensor (e.g., light sensor 612 in FIG. 6, light sensor 1138 in FIG. 11) such as a photoelectric effect-based sensor to measure the brightness in at least a portion of the field of view of the at least one camera and receives the brightness measurement readings via the I/O path of the user device. In some embodiments, at step 914, the light sensor is in communication with the user device via a communication network or a wired connection. In some embodiments, at step 914, non-transitory computer-readable instructions stored on a non-transitory computer readable medium and executed by the control circuitry of user device comprise instructions to control (e.g., enable, disable, calibrate the light sensor using an illumination device able to produce a variety of known brightness levels, forward brightness readings from the light sensor to the user device) the light sensor.

In some embodiments, at step 916, control circuitry of the user device disables the video capture functionality of the at least one camera when the at least one display is in the regular display state. In some embodiments, at step 916, the user device is in communication with at least the at least one camera (e.g., webcam) via a communication network (e.g., LAN or WAN—See communication network 1108 in FIG. 11) or a wired connection. In some embodiments, at step 916, non-transitory computer-readable instructions stored on a non-transitory computer readable medium and executed by control circuitry of the user device comprise instructions to control (e.g., disable or enable) the video capture functionality of the at least one camera based on the alternating of the at least one display between the regular display state and the black-frame display state.

In some embodiments, at step 918, control circuitry of the user device turns off, via the I/O path of the user device, an illumination device (e.g., illumination device 412 in FIG. 4, illumination device 1136 in FIG. 11) when the at least one display is in the regular display state, wherein the illumination device is configured to illuminate at least a portion of a field of view of the at least one camera. In some embodiments, at step 918, the illumination device is in communication with user device via a communication network or a wired connection. In some embodiments, at step 918, non-transitory computer-readable instructions stored on a non-transitory computer readable medium and executed by the control circuitry of the user device comprise instructions to control (e.g., enable, disable or tune the brightness, produced by the illumination device, in at least a portion of the field of view of the at least one camera) the illumination device based on the alternating of the at least one display between the regular display state and the black-frame display state. In some embodiments, at step 918, the control circuitry of the user device then proceeds to step 920.

Alternatively or additionally, at step 918, the control circuitry of the user device proceeds back to step 902.

In some embodiments, at step 920, the control circuitry of the user device appends the captured images to output a video signal based on the captured series of images. In some embodiments, at step 920, the control circuitry of the user device subsequently proceeds to step 922. Alternatively or additionally, at step 920, the control circuitry of the user device subsequently proceeds to step 926.

In some embodiments, at step 922, the control circuitry of the user device stores the video signal in a storage (e.g., storage 1128 of the computing device 1102 in FIG. 11).

In some embodiments, at step 924, the control circuitry generates for display the video signal on the at least one display of the user. In some embodiments, at step 924, the control circuitry of the user device presents the video signal in an insert (e.g., 208*b*, 408*b*, 508*b*, 608*b*, 708*b*, 808*b* or 1208*b*) within an image rendered by the at least one display.

In some embodiments, at step 926, the control circuitry of the user device transmits the video signal to a server (e.g., server 1104 in FIG. 11) via the Input/Output path of the user device. In some embodiments, at step 926, the user device is in communication with a server (e.g., local or remote server) via a communication network (e.g., LAN or WAN). The user device is able to transmit the user's video signal to a server that stores it at an address e.g., URL. The other attendees of the video conference are then able to request, from the server, the user's video signal (using the address), receive and present it on their respective user device.

Figure 10:
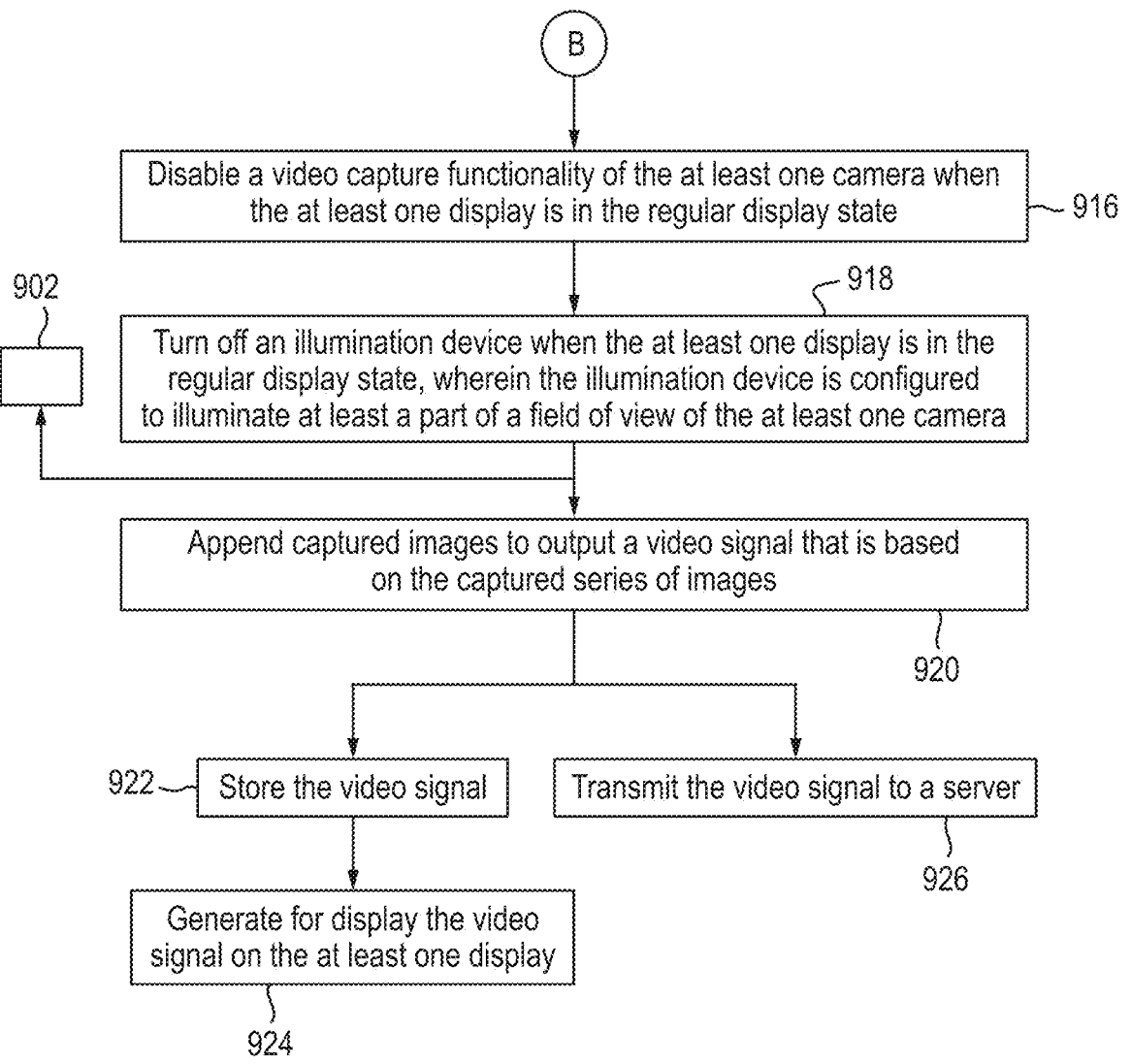
FIG. 10 represents a flowchart describing an example for producing a video signal for a video conference, in accordance with some implementations of the disclosure.

FIG. 10 depicts a flowchart describing an example 1000 for producing a video signal for a video conference, in accordance with some implementations of the disclosure.

In some embodiments, at step 1002, control circuitry of user device (e.g., control circuitry of user devices 306 to 606, or control circuitry 1118 of computing device 1102 in FIG. 11, or control circuitry of user devices 706, 806, 1206 with respect to some embodiments) enable an ability of at least one display (e.g., display 308, 408, 508, 608 or 1124, or display 708, 716, 808, 816, 1208 or 1216 with respect to some embodiments) to alternate between a regular display state and a black-frame display state, via the Input/Output path of the user device (e.g., I/O path 1120 of computing device 1102 in FIG. 11).

In some embodiments, at step 1004, the control circuitry of the user device (e.g., control circuitry of user devices 206 to 806, control circuitry 1118 of computing device 1102 in FIG. 11) requests at least one camera (e.g., camera 310, 410, 510, 610 or 1132 or camera 710, 810, 818 or 1210 with respect to some embodiments) to capture a series of images, wherein each image of the series of images includes a depiction of a reflective surface (e.g., eyeglasses 304) via the Input/Output path of the user device (e.g., I/O path 1120 of computing device 1102 in FIG. 11). In some embodiments, at step 1004, the reflective surface reflects the at least one display only when the at least one display is in the regular display state.

In some embodiments, at step 1006, when the at least one display is in the regular display state, the control circuitry of the user device requests, via the Input/Output path of the user device, the at least one display to insert a watermark (e.g., watermark 316 in FIG. 3) into each image rendered by the at least one display such that each rendered image is reflected on the reflective surface and a reflection of each rendered image is captured by the at least one camera.

In some embodiments, at step 1008, the control circuitry of the user device processes the captured series of images to remove images captured when the at least one display is in the regular display state.

In some embodiments, at step 1010, the control circuitry of the user device identifies each image of the series of images that comprises a depiction of the watermark. In some embodiments, at step 1010, the control circuitry uses a machine learning model to identify the presence and/or absence of the watermark on the captured series of images. In some embodiments, at step 1010, non-transitory computer-readable instructions stored on a non-transitory computer readable medium and executed by control circuitry of the user device comprise instructions to control the machine learning model identifying the presence and/or the absence of a watermark.

In some embodiments, at step 1012, the control circuitry of the user device removes each image that comprises the depiction of the watermark.

In some embodiments, at step 1014, the control circuitry of the user device transmits, via the Input/Output path of the user device, a video signal that is based on the processing the captured series of images. In some embodiments, at step 1014, the control circuitry of the user device transmits, via the Input/Output path of the user device, a video signal that is based on the processing the captured series of images to a server (e.g., local or remote server—See server 1104 in FIG. 11) at a specific address e.g., URL in order for the other video conference attendees' user devices to request from the server, receive from the server and present the video signal. Before sending the video signal to the server, the control circuitry of the user device encodes the video signal.

FIG. 11 illustrates a block diagram showing components of an example system 1100 for producing a video signal for a video conference, in accordance with some implementations of the disclosure.

Although FIG. 11 shows system 1100 as including a number and configuration of individual components, in some examples, any number of the components of system 1100 is combined and/or integrated as one device, e.g., as user device 206, 306, 406, 506, 706, 806 or 1206. System 1100 includes computing device 1102, server 1104, and content database 1106, each of which is communicatively coupled to communication network 1108, which is the Internet or any other suitable network or group of networks. In some examples, system 1100 excludes server 1104, and functionality that would otherwise be implemented by server 1104 is instead implemented by other components of system 1100, such as computing device 1102. In still other examples, server 1104 works in conjunction with computing device 1102 to implement certain functionality described herein in a distributed or cooperative manner.

Server 1104 includes control circuitry 1110 and input/output (hereinafter "I/O") path 1112, and control circuitry 1110 includes storage 1114 and processing circuitry 1116. Computing device 1102, which can be a personal computer, a laptop computer, a tablet computer, a smartphone, a smart television, a smart speaker, or any other type of computing device, includes control circuitry 1118, I/O path 1120, speaker 1122, display 1124, and user input interface 1126, which in some examples provides a user selectable option for enabling and disabling the display of modified closed captions. Control circuitry 1118 includes storage 1128 and processing circuitry 1130. Control circuitry 1110 and/or 1118 is based on any suitable processing circuitry such as processing circuitry 1116 and/or 1130. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 1114, storage 1128, and/or storages of other components of system 1100 (e.g., storages of content database 1106, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1114, storage 1128, and/or storages of other components of system 1100 is used to store various types of content, metadata, and or other types of data. Non-volatile memory also is used (e.g., to launch a boot-up routine and other instructions). Cloud-based storage is used to supplement storages 1114, 1128 or instead of storages 1114, 1128. In some examples, control circuitry 1110 and/or 1118 executes instructions for an application stored in memory (e.g., storage 1114 and/or 1128). Specifically, control circuitry 1110 and/or 1118 is instructed by the application to perform the functions discussed herein. In some implementations, any action performed by control circuitry 1110 and/or 1118 is based on instructions received from the application. For example, the application is implemented as software or a set of executable instructions that is stored in storage 1114 and/or 1128 and executed by control circuitry 1110 and/or 1118. In some examples, the application is a client/server application where only a client application resides on computing device 1102, and a server application resides on server 1104.

The application is implemented using any suitable architecture. For example, it is a stand-alone application wholly implemented on computing device 1102. In such an approach, instructions for the application are stored locally (e.g., in storage 1128), and data for use by the application is downloaded on a periodic basis (e.g., from an out-of-band feed, from an Internet resource, or using another suitable approach). Control circuitry 1118 retrieves instructions for the application from storage 1128 and process the instructions to perform the functionality described herein. Based on the processed instructions, control circuitry 1118 determines what action to perform when input is received from user input interface 1126.

In client/server-based examples, control circuitry 1118 includes communication circuitry suitable for communicating with an application server (e.g., server 1104) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 1108). In another example of a client/server based application, control circuitry 1118 runs a web browser that interprets web pages provided by a remote server (e.g., server 1104). For example, the remote server stores the instructions for the application in a storage device. The remote server processes the stored instructions using circuitry (e.g., control circuitry 1110) and/or generates displays. Computing device 1102 receives the displays generated by the remote server and displays the content of the displays locally via display 1124. This way, the processing of the instructions is performed remotely (e.g., by server 1104) while the resulting displays are provided locally on computing device 1102. Computing device 1102 receives inputs from the user via input interface 1126 and transmits those inputs to the remote server for processing and generating the corresponding displays.

A user sends instructions, e.g., to view an interactive media content item and/or selects one or more programming options of the interactive media content item, to control circuitry 1110 and/or 1118 using user input interface 1126. User input interface 1126 is any suitable user interface, such as a remote control, trackball, keypad, keyboard, touchscreen, touchpad, stylus input, joystick, speech recognition interface, gaming controller, or other user input interfaces. User input interface 1126 is integrated with or combined with display 1124, which can be a monitor, a television, a liquid crystal display (LCD), an electronic ink display, or any other equipment suitable for displaying visual images.

Server 1104 and computing device 1102 transmits and receives content and data via I/O path 1112 and 1120, respectively. For instance, I/O path 1112 and/or I/O path 1120 includes a communication port(s) configured to transmit and/or receive (for instance to and/or from content database 1106), via communication network 1108, content item identifiers, content metadata, natural language queries, and/or other data. Control circuitry 1110, 1118 is used to send and receive commands, requests, and other suitable data using I/O paths 1112, 1120. I/O paths 1112 of server 1104 and I/O paths 1120 of computing device 1102 each comprises I/O circuitry e.g., network interface, port, bus, wire.

In some embodiments, each of at least one camera 1132 (e.g., one or more cameras) integrating a shutter (e.g., rotating shutter 1132*a*), at least one display 1134 (e.g., one or more external displays) illumination device 1136 (e.g., auxiliary lamp whose brightness is voltage-dependent), light sensor 1136 (e.g., photoelectric effect-based sensor such as a photodiode) and eye-tracking device 1138 (e.g., eye-tracking device comprising an infrared emitter and infrared sensor) is in communication with computing device 1102 through a wired connection 1142 and the I/O path 1120 of a computing device 1102, or via communication network 1108 (e.g., WAN or LAN).

In some embodiments, a video conference application is stored in storage 1128 of computing device 1102. Control circuitry 1128 of computing device 1102 runs the video conference application that allows, for instance, for:

controlling (e.g., enabling or disabling the BFI option) the at least one display 1134 via the I/O path 1120;

controlling (e.g., capturing images when at least one display 1134 is in a black-frame display state or capturing images at all times irrespective of the display state in which the at least one display 1134 is, synchronizing the capturing of the series of images with a user-selected display of the at least one display 1134 alternating between a regular display state and a black-frame display state using eye-tracking device 1140, controlling the velocity of rotating shutter 1132*a*, enabling or disabling the video capture functionality of the at least one camera) the at least one camera 1132 via the I/O path 1120;

generating a video signal from the images captured by the at least one camera 1132;

processing (e.g., removing images captured when the at least one display 1134 was in the regular display state) the video signal;

using storage 1128 to store the video signal;

rendering the video signal by the at least one display 1134 within an insert;

using the I/O path 1120 of computing device 1102 and communication network 1108 to forward the video signal to a server 1104;

controlling (e.g., turning on illumination device 1136 when the at least one display 1134 is in the black-frame display state, setting a brightness level in at least a portion of the field of view of the at least one camera 1132 by varying the voltage to which illumination device 1136 is subjected, turning off illumination device 1136 when the at least one display 1134 is in the regular display state) illumination device 1136 via the I/O path 1120;

controlling (e.g., turning on or off, determining the brightness changes in at least a portion of the field of view of the at least one camera 1132, that occur to the at least one display 1134, forwarding results provided by light sensor 1138 to computing device 1102) light sensor 1138 via the I/O path 1120; and controlling (e.g., turning on or off, determining where the user's gaze points to, forwarding results provided by eye-tracking device 1140 to computing device 1102) eye-tracking device 1140 via the I/O path 1120.

FIG. 12 shows components of an example 1200 for producing a video signal for a video conference, in accordance with some implementations of the disclosure. Example 1200 comprises a user device 1206, a first display 1208, a second display 1216 and a camera 1210. Each of first display 1208 and second display 1216 alternates between a same regular display frame and a same black-frame display state at the same time i.e., first display 1208 and second display 1216 are in phase. In some embodiments, example 1200 is used to implement the steps of e.g., example 200. In some embodiments, example 1200 is used in combination with at least one of examples 400, 500 and 600 to implement the steps of e.g., example 200.

In some embodiments, first display 1208 and second display 1216 are in phase. When first display 1208 and second display 1216 are in the regular display state, first display 1208 renders an image 1208*a* while second display 1216 renders an image 1216*a* which is different from image 1208*a* (although image 1208*a* and image 1216*a* could be identical to each other). In addition, when first display 1208 and second display 1216 are in the black-frame display state, first display 1208 renders a black frame 1208*c* while second display 1216 renders a black frame 1216*c* which always corresponds to black frame 1208*c* as black frame 1208*c* and black frame 1216*c* represent the cases where first display 1208 and second display 1216 emit no light, respectively. Insert 1208*b* presents the video signal captured by camera 1210.

In some embodiments, when a user 1202 has two displays (first display 1208 and second display 1216) in phase and one camera (camera 1210) at disposal during a video conference, user 1202 usually directs their gaze towards one of the two displays (first display 1208 or second display 1216). To do so, user 1212 usually rotates their head to gaze at the display of interest (i.e., second display 1216), rather than moving their eyes. Since first display 1208 and second display 1216 are in phase, there is no need to use an eye-tracking device to determine the display at which the user gazes so as to synchronize the capturing the series of images with the display the user gazes at. User device 1206 requests camera 1210 to capture a series of images when first display 1208 and second display 1216 are simultaneously in the black-frame display state, resulting in the elimination of the reflection of the image 1216c rendered by second display 1216 (user 1202 gazes at), on the user's eyeglasses 1204.

In some embodiments, example 1200 is used to implement the steps of e.g., example 300. User device 1206 does not synchronize the capturing of the series of images with first display 1208 and second display 1216 alternating between a same regular display state and a same black-frame display state (since both displays 1208 and 1216 are in phase). The capturing of the series of images is to occur at all times, irrespective of the display state in which both first display 1208 and second display 1216 are. After processing of the captured images, the video signal is to be based exclusively on images captured when both first display 1208 and second display 1216 are in the black-frame display state.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

capturing, by at least one camera, a series of images, wherein each image of the series of images includes a depiction of a reflective surface, wherein:

the capturing is synchronized with at least one display alternating between: (a) a regular display state, and (b) a black-frame display state, wherein the captured series of images are captured only when the at least one display is in the black-frame display state;

the reflective surface reflects the at least one display only when the at least one display is in the regular display state; and wherein the capturing the series of images comprises:

disabling a video capture functionality of the at least one camera when the at least one display is in the regular display state; and enabling the video capture functionality of the at least one camera when the at least one display is in the black-frame display state; and outputting a video signal that is based on the captured series of images.

2. The method of claim 1, wherein:

the reflective surface comprises surface of glasses worn by a user participating in a video conference via the at least one display; and the video signal is transmitted into the video conference.

3. A method comprising:

capturing, by at least one camera, a series of images, wherein each image of the series of images includes a depiction of a reflective surface, wherein:

the capturing is synchronized with at least one display alternating between: (a) a regular display state, and (b) a black-frame display state, wherein the captured series of images are captured only when the at least one display is in the black-frame display state; and the reflective surface reflects the at least one display only when the at least one display is in the regular display state; and wherein the capturing the series of images comprises:

closing an aperture of the at least one camera when the at least one display is in the regular display state; and opening the aperture of the at least one camera when the at least one display is in the black-frame display state; and outputting a video signal that is based on the captured series of images.

4. The method of claim 1, further comprising:

turning off an illumination device when the at least one display is in the regular display state; and turning on the illumination device when the at least one display is in the black-frame display state, wherein the illumination device is configured to illuminate at least a part of a field of view of the at least one camera.

5. The method of claim 1, wherein the capturing the series of images further comprises:

receiving, by a device that controls the at least one camera, an indication of timing of the at least one display switching between the regular display state and the black-frame display state; and wherein the alternating between: (a) the regular display state, and (b) the black-frame display state is based on the indication of timing of the at least one display switching between the regular display state and the black-frame display state.

6. The method of claim 1, further comprising:

detecting brightness changes in a field of view of the at least one camera, that occur to the at least one display switching between the regular display state and the black-frame display state; and wherein the alternating between: (a) the regular display state, and (b) the black-frame display state is based on the detected brightness changes.

7. The method of claim 1, wherein:

the at least one camera comprises a first camera;

the at least one display comprises a first display and a second display; and the reflective surface comprises surface of glasses worn by a user participating in a video conference via the first display and the second display such that the captured series of images depicts at least one eye of the user behind the surface of glasses;

the method further comprising:

in response to determining that a retina of the at least one eye of the user is directed to the first display, synchronizing the capturing with the first display alternating between: (a) the regular display state, and (b) the black-frame display state; and in response to determining that the retina of the at least one eye of the user is directed to the second display, synchronizing the capturing with the second display alternating between: (a) the regular display state, and (b) the black-frame display state.

8. The method of claim 1, wherein:

the at least one camera comprises a first camera;

the at least one display comprises a first display and a second display;

wherein the capturing is synchronized with both:

(i) the first display alternating between: (a) the regular display state of the first display, and (b) the black-frame display state of the first display; and (ii) the second display alternating between: (c) the regular display state of the second display, and (d) the black-frame display state of the second display; and wherein the captured series of images are captured only when each of the first display and the second display is in a respective black-frame display state.

9. The method of claim 1, wherein:

the at least one camera comprises a first camera; and the at least one display comprises a first display and a second display;

the method further comprising:

configuring the first display and the second display to synchronize:

(i) the first display alternating between: (a) the regular display state of the first display, and (b) the black-frame display state of the first display; and (ii) the second display alternating between: (c) the regular display state of the second display, and (d) the black-frame display state of the second display.

10. The method of claim 1, wherein:

the at least one camera comprises a first camera and a second camera;

the at least one display comprises a first display and a second display;

the reflective surface comprises surface of glasses worn by a user participating in a video conference via the first display and the second display; and the capturing the series of images comprises:

capturing, by the first camera, a first series of images when a retina of at least one eye of the user points towards the first display; and capturing, by the second camera, a second series of images when the retina of the at least one eye the user points towards the second display.

11. The method of claim 10, wherein an aperture of the first camera is located closer to the first display than the second display and an aperture of the second camera is located closer to the second display than the first display.

12. The method of claim 1, wherein:

the outputting the video signal that is based on the captured series of images comprises:

storing the video signal; and generating for display the video signal on the at least one display.

13. The method of claim 1, wherein:

the outputting the video signal that is based on the captured series of images comprises transmitting the video signal to a server.

14. A system comprising:

at least one camera;

control circuitry configured to:

capture, by the at least one camera, a series of images, wherein each image of the series of images includes a depiction of a reflective surface, wherein:

the capturing is synchronized with at least one display alternating between: (a) a regular display state, and (b) a black-frame display state, wherein the captured series of images are captured only when the at least one display is in the black-frame display state;

the reflective surface reflects the at least one display only when the at least one display is in the regular display state; and wherein the control circuitry, when capturing the series of images, is configured to:

disable a video capture functionality of the at least one camera when the at least one display is in the regular display state; and enable the video capture functionality of the at least one camera when the at least one display is in the black-frame display state; and output a video signal that is based on the captured series of images.

15. The system of claim 14, wherein:

the reflective surface comprises surface of glasses worn by a user participating in a video conference via the at least one display; and the video signal is transmitted into the video conference.

16. The system of claim 14, wherein the control circuitry is further configured to capture the series of images by:

receiving an indication of timing of the at least one display switching between the regular display state and the black-frame display state; and wherein the alternating between: (a) the regular display state, and (b) the black-frame display state is based on the indication of timing of the at least one display switching between the regular display state and the black-frame display state.

17. The system of claim 14, wherein:

the at least one camera comprises a first camera;

the at least one display comprises a first display and a second display; and the reflective surface comprises surface of glasses worn by a user participating in a video conference via the first display and the second display such that the captured series of images depicts at least one eye of the user behind the surface of glasses;

wherein the control circuitry is further configured to:

in response to determining that a retina of the at least one eye of the user is directed to the first display, synchronize the capturing with the first display alternating between: (a) the regular display state, and (b) the black-frame display state; and in response to determining that the retina of the at least one eye of the user is directed to the second display, synchronize the capturing with the second display alternating between: (a) the regular display state, and (b) the black-frame display state.

18. The system of claim 14, wherein the control circuitry is further configured to:

detect brightness changes in a field of view of the at least one camera, that occur to the at least one display switching between the regular display state and the black-frame display state; and wherein the alternating between: (a) the regular display state, and (b) the black-frame display state is based on the detected brightness changes.

19. The system of claim 14, wherein the control circuitry, when outputting the video signal that is based on the captured series of images, is configured to:

cause storage of the video signal; and cause generation for display the video signal on the at least one display.

20. The system of claim 14, wherein the control circuitry, when outputting the video signal that is based on the captured series of images, is configured to transmit the video signal to a server.

\* \* \* \* \*